United States Patent
Hoemke et al.

(10) Patent No.: US 9,625,053 B2
(45) Date of Patent: Apr. 18, 2017

(54) HYDRAULIC ACTUATOR LOCKOUT

(71) Applicant: Woodward, Inc., Fort Collins, CO (US)

(72) Inventors: Brian Hoemke, Belvidere, IL (US); Shawn Justin Pollock, Timnath, CO (US); Adam J. Kurzynski, Huntley, IL (US); Aaron Hrdlichka, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 49 days.

(21) Appl. No.: 14/514,181

(22) Filed: Oct. 14, 2014

(65) Prior Publication Data
US 2016/0102778 A1    Apr. 14, 2016

(51) Int. Cl.
*F16K 3/24* (2006.01)
*F16K 31/122* (2006.01)
(Continued)

(52) U.S. Cl.
CPC .............. *F16K 35/10* (2013.01); *F15B 13/04* (2013.01); *F15B 13/0438* (2013.01);
(Continued)

(58) Field of Classification Search
CPC ........ F15B 13/01; F15B 13/0438; F15B 9/02; F15B 9/08; F15B 9/09; F16K 3/24; F16K 3/314; F16K 31/122; F16K 31/143; F16K 35/00; F16K 35/10; G05D 7/0635; Y10T 137/2559; Y10T 137/86574;
(Continued)

(56) References Cited

U.S. PATENT DOCUMENTS 2,609,108 A * 9/1952 Peterson ................ B65G 47/92
                                                    137/625.6
2,678,799 A * 5/1954 St Clair .................. F17C 13/04
                                                    137/495
(Continued)

FOREIGN PATENT DOCUMENTS

FR           2521232 A1      8/1983

OTHER PUBLICATIONS

PCT International Search Report and Written Opinion of the International Searching Authority, PCT/US2015/055294, Apr. 5, 2016, 18 pages.

*Primary Examiner* — Marina Tietjen
*Assistant Examiner* — Seth W MacKay-Smith
(74) *Attorney, Agent, or Firm* — Fish & Richardson P.C.

(57) ABSTRACT

The subject matter of this specification can be embodied in, among other things, an apparatus that includes a valve with a valve housing having an axial bore, a first inlet port, a first outlet port, and a piston located within the axial bore and having a first fluid passage and configured to allow reciprocal axial movement of the piston within the axial bore between a first position in which the first fluid passage aligns axially with the first inlet port and the first outlet port to form a first fluidic circuit, and a second position in which the piston blocks at least one of the first inlet port and the first outlet port. The apparatus also includes a lockout assembly configurable to fix the piston into a selected position in a first configuration, and not interfere with reciprocal axial movement of the piston in a second configuration.

38 Claims, 10 Drawing Sheets

(51) Int. Cl.

| | | |
|---|---|---|
| *F16K 31/143* | (2006.01) | |
| *F16K 35/00* | (2006.01) | |
| *G05D 7/06* | (2006.01) | |
| *F15B 9/08* | (2006.01) | |
| *F15B 9/09* | (2006.01) | |
| *F16K 35/10* | (2006.01) | |
| *F16K 1/34* | (2006.01) | |
| *F16K 1/16* | (2006.01) | |
| *F16K 11/04* | (2006.01) | |
| *F16K 31/04* | (2006.01) | |
| *F16K 35/02* | (2006.01) | |
| *F15B 13/04* | (2006.01) | |
| *F15B 13/043* | (2006.01) | |
| *F15B 20/00* | (2006.01) | |

(52) U.S. Cl.
CPC ............... *F15B 20/00* (2013.01); *F16K 1/16* (2013.01); *F16K 1/34* (2013.01); *F16K 11/04* (2013.01); *F16K 31/04* (2013.01); *F16K 31/122* (2013.01); *F16K 35/022* (2013.01); *F15B 2211/8752* (2013.01); *Y10T 137/8663* (2015.04); *Y10T 137/8671* (2015.04); *Y10T 137/86574* (2015.04); *Y10T 137/86582* (2015.04); *Y10T 137/86694* (2015.04)

(58) Field of Classification Search
CPC ..... Y10T 137/86582; Y10T 137/86622; Y10T 137/8663; Y10T 137/86694; Y10T 137/8671
See application file for complete search history.

(56) References Cited

U.S. PATENT DOCUMENTS

| | | | | |
|---|---|---|---|---|
| 2,870,789 | A * | 1/1959 | Bilaisis | F15B 13/0402 137/625.6 |
| 3,656,600 | A * | 4/1972 | Kitano | F16D 25/14 137/625.6 |
| 3,762,443 | A * | 10/1973 | Sorenson | F15B 13/04 137/625.27 |
| 3,923,240 | A * | 12/1975 | Glaze | B60G 17/005 137/625.69 |
| 3,972,503 | A | 8/1976 | Smith | |
| 4,046,165 | A | 9/1977 | Rose et al. | |
| 4,084,618 | A * | 4/1978 | Gurries | F16K 27/041 137/625.48 |
| 4,094,229 | A * | 6/1978 | Leonard | F15B 9/08 60/445 |
| 4,190,081 | A * | 2/1980 | Coles | F15B 13/0402 137/624.27 |
| 4,369,677 | A * | 1/1983 | Lewis | F16H 61/029 137/625.69 |
| 4,531,709 | A * | 7/1985 | Maddalozzo | E02F 9/2267 137/625.69 |
| 5,465,757 | A * | 11/1995 | Peters | F15B 13/0438 137/625.65 |
| 5,595,218 | A * | 1/1997 | Hallbach | F16K 11/07 137/625.18 |
| 5,996,464 | A | 12/1999 | McLevige et al. | |
| 6,186,045 | B1 | 2/2001 | Hoemke | |
| 6,315,265 | B1 * | 11/2001 | Adler | F01L 9/02 123/90.12 |
| 6,755,205 | B1 * | 6/2004 | Hoemke | F15B 13/0438 137/625.62 |
| 6,997,673 | B2 | 2/2006 | Morris et al. | |
| 7,337,806 | B2 | 3/2008 | Spickard et al. | |
| 7,357,368 | B2 * | 4/2008 | Takeda | F16K 31/143 251/331 |
| 7,380,571 | B2 * | 6/2008 | Okamoto | F16J 15/104 137/625.63 |
| 7,926,512 | B2 | 4/2011 | Spickard et al. | |
| 9,004,097 | B2 * | 4/2015 | Crawford | G05D 7/014 137/492 |
| 9,027,907 | B2 | 5/2015 | Brinks et al. | |
| 9,133,958 | B2 * | 9/2015 | Larsen | F16K 31/1221 |
| 2005/0236053 | A1 | 10/2005 | Miyazoe | |
| 2015/0240827 | A1 | 8/2015 | Hoemke | |
| 2015/0285143 | A1 | 10/2015 | Pollock et al. | |
| 2015/0292525 | A1 | 10/2015 | Baker et al. | |
| 2015/0369372 | A1 | 12/2015 | Hrdlichka et al. | |

* cited by examiner

HYDRAULIC ACTUATOR LOCKOUT

TECHNICAL FIELD

This instant specification relates to lockout devices for fluid actuators controlled by fluid servo valves and solenoid valves.

BACKGROUND

Servo valves and solenoids can be used to control fluid flow, for example, in hydraulic systems and continuous fluid flow systems. In some implementations, servo valves include a movable piston in a housing actuated by a movable flapper.

In commercial airline applications the more time an aircraft can remain in service, as opposed to being grounded awaiting repair, the more passenger revenue the plane can generate. In military aircraft applications, the more time an aircraft can remain in service, the greater the capability of that aircraft to perform its mission when needed.

SUMMARY

The description below relates to lockout devices for fluid actuators controlled by fluid servo valves and solenoid valves.

In a first aspect, a fluid control apparatus includes a servo valve with a valve housing having an axial bore extending between a first end and a second end, a first inlet port in fluid communication with the axial bore, and a first outlet port in fluid communication with the axial bore, and a piston located within the axial bore and having a first fluid passage and configured to allow reciprocal axial movement of the piston within the axial bore between a first position in which the first fluid passage aligns axially with the first inlet port and the first outlet port to form a first fluidic circuit in the first position, and a second position in which the piston blocks at least one of the first inlet port and the first outlet port. The apparatus also includes a lockout assembly configurable to fix the piston into a selected position in a first configuration, and not interfere with reciprocal axial movement of the piston in a second configuration.

Various embodiments can include some, all, or none of the following features. The selected position can be the first position. The selected position can be the second position. The lockout assembly can also include a lock operable to prevent disengagement of the lockout assembly from at least one of the first configuration and the second configuration. The lockout assembly can include a stop configurable to contact the piston in the first configuration and not contact the piston in the second configuration. The stop can be disposed at an axial end of the piston. The stop can include a cam, the first configuration can include a first rotary position of the cam, and the second configuration can include a second rotary position of the cam. The lockout assembly can also include a support coupled to the valve housing and having a threaded bore therein, the stop can also include a fastener threadedly engaged with the threaded bore, the first configuration can include threading the fastener through the threaded bore so as to contact the piston, and the second configuration can include threading the fastener through the threaded bore so as to not contact the piston. The valve housing can also include a fluid chamber at one of the first end or the second end, the piston can also include an axial piston end forming a moveable portion of the fluid chamber, the piston being axially moveable to the selected position by fluidic pressure applied to the axial piston end. The fluid chamber can be in fluidic communication with a second inlet port and a second outlet port, the lockout assembly can include an outlet valve in fluidic communication with the second outlet port, and the first configuration can permit the pressurized fluid to flow out of the fluid chamber, and the second configuration can prevent flow of the pressurized fluid from the fluid chamber. The second inlet port can be in fluidic communication with a pressurized fluid, the first configuration can permit a threshold fluid pressure within the fluid chamber sufficient to urge the piston into the selected position, and the second configuration can relieve the fluid pressure within the fluid chamber below the threshold fluid pressure. The lockout assembly can include a stop configurable to extend through the fluid chamber and contact the axial piston end in the first configuration and not contact the axial piston end in the second configuration. The piston can be fluidly connected on a first end to a first fluid pressure chamber and fluidly connected on a second end to a second fluid pressure chamber, the piston configured for reciprocal axial movement in response to a pressure differential between a first fluid in the first fluid pressure chamber and a second fluid in the second fluid pressure chamber, the servo valve can also include a flapper assembly including an activation portion and closure portion, said closure portion of the flapper assembly extending from the activation portion, said flapper assembly configured to move said closure portion to engage a first fluid flow control element on the first fluid pressure chamber when the closure portion is in a first closure position and configured to move said closure portion to engage a second fluid flow control element on the second fluid pressure chamber when the closure portion is in a second closure position, and the lockout assembly can include a stop configurable to fix the activation portion in a selected activation position in the first configuration and not interfere with movement of the activation portion in the second configuration. The selected activation position can position the closure to a selected closure position. The selected closure position can be the first closure position. The selected closure position can be the second closure position. The lockout assembly can also include a support coupled to the valve housing and having a threaded bore therein, the stop can also include a fastener threadedly engaged with the threaded bore, the first configuration can include threading the fastener through the threaded bore so as to contact the activation portion, and the second configuration can include threading the fastener through the threaded bore so as to not contact the activation portion. The apparatus can also include a fluid actuator having a stator portion, an actuator portion, and a fluid chamber between the stator portion and the actuator portion, the fluid chamber in fluid communication with the first outlet. The apparatus can also include a high-capacity fluid valve having a fluid control portion coupled to the actuator portion. The fluid control portion can be operable to control a flow of fluid to an aircraft component.

In a second aspect, a fluid control apparatus includes a valve having an inlet port in fluid communication with a control fluid source and an outlet port, the valve being configured to control a flow of fluid from the inlet port to the outlet port, a reference fluid source configured to provide a reference fluid at a predetermined reference pressure and flow, a fluid actuator having a fluid chamber, and a lockout assembly having a valve configurable to a first configuration providing a fluid path from the outlet port to the fluid chamber, and a second configuration providing a fluid path from the reference fluid source to the fluid chamber.

In a third aspect, a method of controlling a fluid flow includes providing a servo valve having a valve housing having an axial bore extending between a first end and a second end, a first inlet port in fluid communication with the axial bore, and a first outlet port in fluid communication with the axial bore, a piston located within the axial bore and having a first fluid passage and configured to allow reciprocal axial movement of the piston within the axial bore between a first position in which the first fluid passage aligns axially with the first inlet port and the first outlet port to form a first fluidic circuit in the first position, and a second position in which the piston blocks at least one of the first inlet port and the first outlet port. The method also includes providing a lockout assembly configurable to fix the piston into a selected position in a first configuration, and not interfere with reciprocal axial movement of the piston in a second configuration, actuating the lockout assembly into the first configuration, and fixing, by the lockout assembly, the piston into a selected position.

Various implementations can include some, all, or none of the following features. The method can also include locking the lockout assembly into the first configuration, wherein the lockout assembly further comprises a lock operable to prevent disengagement of the lockout assembly from the first configuration. The selected position can be the first position. The selected position can be the second position. The method can also include actuating the lockout assembly into the second configuration, and releasing, by the lockout assembly, the piston from being fixed in the selected position such that the lockout assembly does not interfere with reciprocal axial movement of the piston. The method can also include locking the lockout assembly into the second configuration, wherein the lockout assembly further comprises a lock operable to prevent disengagement of the lockout assembly from the second configuration. The method can also include contacting the piston with a stop, wherein the lockout assembly can include the stop, the stop being configurable to contact the piston in the first configuration and not contact the piston in the second configuration. The stop can include a cam, the first configuration can include a first rotary position of the cam, and the second configuration can include a second rotary position of the cam. The lockout assembly can also include a support coupled to the valve housing and having a threaded bore therein, the stop can include a fastener threadedly engaged with the threaded bore, and contacting the piston with the stop can also include threading the fastener through the threaded bore so as to contact the piston. The valve housing can include a fluid chamber at one of the first end or the second end, the piston can also include an axial piston end forming a moveable portion of the fluid chamber, the piston being axially moveable to the selected position by fluidic pressure applied to the axial piston end. The fluid chamber can be in fluidic communication with a second inlet port and a second outlet port, the lockout assembly can include an outlet valve in fluidic communication with the second outlet port, and actuating the lockout assembly into the second configuration can also include preventing flow of the pressurized fluid from the fluid chamber. The second inlet port can be in fluidic communication with a pressurized fluid, actuating the lockout assembly into the first configuration can include permitting a threshold fluid pressure within the fluid chamber sufficient to urge the piston into the selected position, and actuating the lockout assembly into the second configuration can include relieving the fluid pressure within the fluid chamber below the threshold fluid pressure. The lockout assembly can include a stop configurable to extend through the fluid chamber and contact the axial piston end in the first configuration and not contact the axial piston end in the second configuration. The piston can be fluidly connected on a first end to a first fluid pressure chamber and fluidly connected on a second end to a second fluid pressure chamber, the piston configured for reciprocal axial movement in response to a pressure differential between a first fluid in the first fluid pressure chamber and a second fluid in the second fluid pressure chamber, the servo valve can also include a flapper assembly including an activation portion and closure portion, said closure portion of the flapper assembly extending from the activation portion, said flapper assembly configured to move said closure portion to engage a first fluid flow control element on the first fluid pressure chamber when the closure portion is in a first closure position and configured to move said closure portion to engage a second fluid flow control element on the second fluid pressure chamber when the closure portion is in a second closure position, and the lockout assembly can include a stop configurable to fix the activation portion in a selected activation position in the first configuration and not interfere with movement of the activation portion in the second configuration. The selected activation position can position the closure to a selected closure position. The selected closure position can be the first closure position. The selected closure position can be the second closure position. The lockout assembly can also include a support coupled to the valve housing and having a threaded bore therein, the stop can include a fastener threadedly engaged with the threaded bore, actuating the lockout assembly into the first configuration can include threading the fastener through the threaded bore so as to contact the activation portion. The method can also include providing a fluid actuator having a stator portion, an actuator portion, and a fluid chamber between the stator portion and the actuator portion, the fluid chamber in fluid communication with the first outlet, and fixing, in response to fixing the piston into the selected position, the fluid actuator into a selected fluid actuator position. The method can also include providing a high-capacity fluid valve having a fluid control portion coupled to the actuator portion, and fixing, in response to fixing the actuator into the selected actuator position, the high-capacity fluid valve into a selected valve position. The fluid control portion can be operable to control a flow of fluid to an aircraft component. The lockout assembly can include a valve, and the method can also include providing a fluid pressure source, configuring the valve into a first configuration, providing a fluid path from the first outlet port to the fluid chamber, configuring the valve into a second configuration, providing a fluid path from the fluid pressure source to the fluid chamber.

The systems and techniques described here may provide one or more of the following advantages. First, a system can provide hydraulic lockout control over an aircraft component in implementations in which conventional mechanical lockout control is currently used. Second, the system can provide remote lockout control over hydraulic components. Third, the system can provide hydraulic lockout control over an aircraft component with a reduced weight relative to mechanical lockout controls. Fourth, the system can provide hydraulic lockout control over an aircraft component with a reduced cost relative to mechanical lockout controls. Fifth, the system can provide hydraulic lockout control over an aircraft component with a reduced size relative to mechanical lockout controls. Sixth, the system can be retrofitted into applications that currently lack lockout control or implement mechanical lockout control.

The details of one or more implementations are set forth in the accompanying drawings and the description below. Other features and advantages will be apparent from the description and drawings, and from the claims.

DETAILED DESCRIPTION

Figure 1A:
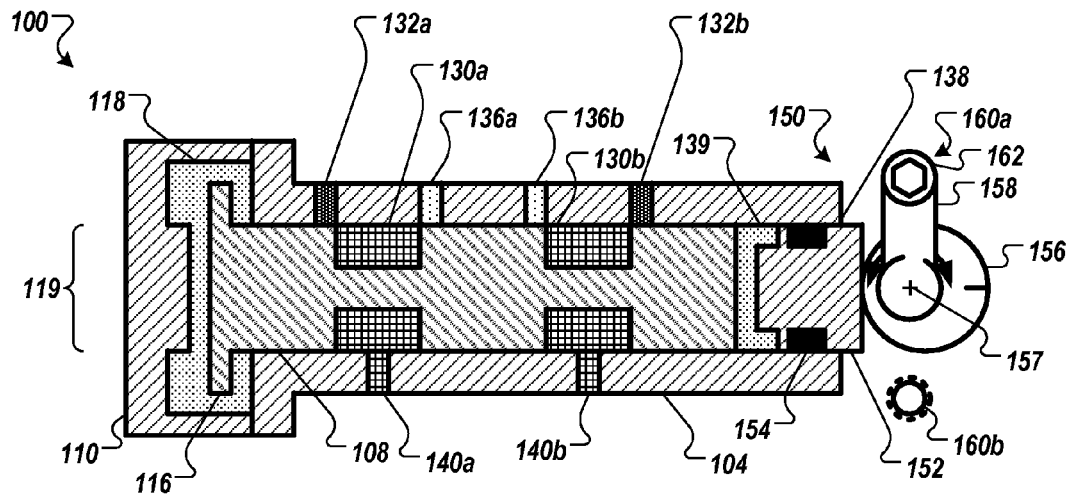
FIGS. 1A and 1B are cross-sectional views of an example servo valve with an example lockout assembly in an unlocked configuration and a locked-out configuration, respectively.

This document describes systems and techniques for locking out hydraulic actuators. Servo valves are sometimes used as part of a multi-stage apparatus configured to control the flows of fluids at pressures and/or flow rates that are too great to be controlled by the servo valve directly. The servo valve may be used as a first stage to control the flow of fluid to a linear, or rotary, fluid actuator second stage used to amplify the fluid force of the servo and actuate a regulator (e.g., valve, nozzle) for controlling the flow of a controlled fluid.

Under some circumstances, there may be a need to override the action of the multi-stage apparatus and "lock" the regulator in a closed or wide-open configuration, or any other selected position. For example, a multi-stage apparatus may be normally used in the operation of a less-critical aircraft function, but nevertheless a malfunction of the servo valve or the system controlling the servo valve may require the plane to remain grounded until the malfunction can be overridden or repaired. In some such examples, the aircraft may be made airworthy again by temporarily overriding the operation of the servo valve and locking the regulator (e.g., valve, nozzle) of the controlled fluid in a closed, wide open, or other predetermined position.

In a more specific example, the multi-stage apparatus may be used to control a flow of air to cool a jet engine, in which excess heat may damage the engine, while excess cooling may only cause the engine to run at less than peak fuel efficiency without any additional safety concerns. If a servo valve without a lockout apparatus malfunctions in such an application, the engine may overheat and present a danger requiring the aircraft to remain grounded until the malfunction can be diagnosed and repaired. However, by including a lockout apparatus such as one or more of those described below, the apparatus may be temporarily locked-out to cause (in this particular example) the cooling air flow to be locked away from a configuration that could cause a potentially dangerous overheat condition, and into a configuration that errs on the side of safety in which the engine is overcooled and less efficient, but otherwise safe to operate.

In some implementations, the use of a servo valve with a lockout apparatus may be used to reduce the amount of time needed to return an aircraft or other application to operational status. For example, in a multi-stage fluid control apparatus, the controlled fluid, the fluid regulator, and/or the second stage fluid actuator may be in a location that is difficult or time consuming to access (e.g., to repair or to lock out directly). In such examples, the servo valve of the first stage may be located remotely from the second stage, in a location that is more quickly and easily accessed. For example, the lockout apparatus may be located behind an access panel and may be secured in the locked-out configuration in a matter of minutes using only a technician's hands and/or basic tools. In commercial aircraft applications, by locking out a non-critical function, a plane may be able to be able to complete a flight or be flown to a repair facility. In military aircraft applications, by locking out a non-critical function, a plane may be returned to service quickly or a battle-damaged plane may be "limped" back to safe territory.

Figure 1B:
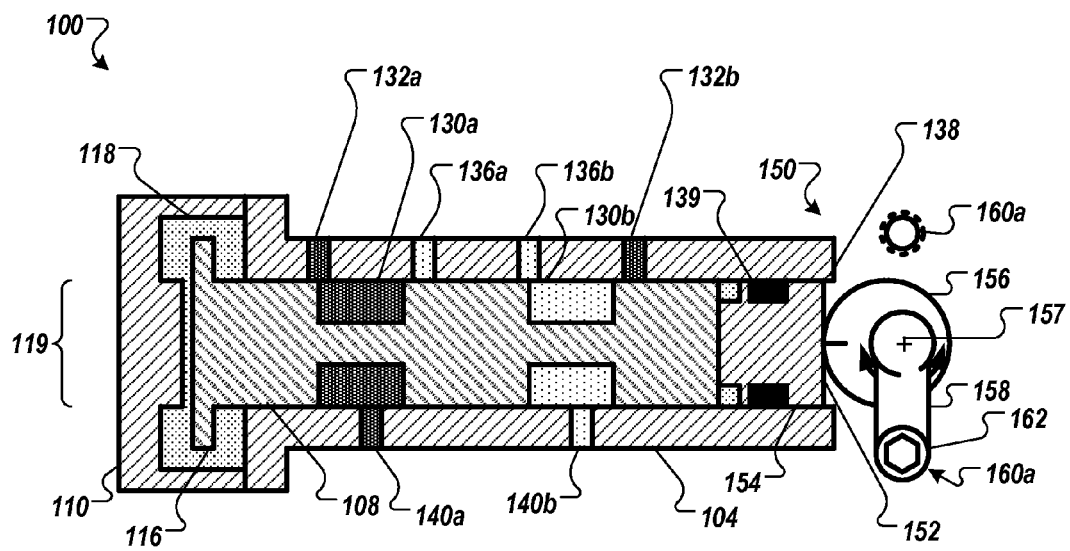

FIGS. 1A and 1B are cross-sectional views of an example servo valve 100 with an example lockout assembly 150 in an unlocked configuration and a locked-out configuration, respectively. The servo valve 100 includes a piston housing 104, a piston 108 disposed in a chamber 119 of the housing 104, and a fluid chamber housing 110. The piston 108 is fluidly connected on a first end 116 to a first fluid pressure chamber 118, and the piston 108 is fluidly connected on a second end 138 to a second fluid pressure chamber 139. The piston 108 is configured to translate axially within the housing 104 in response to a pressure of a first fluid in the first fluid pressure chamber 118 and/or the pressure of a second fluid in the second fluid pressure chamber 139.

The cross-sectional shape of the piston 108 and housing 104 can vary. For example, the piston 108 and the housing 104 can each have a rectangular, square, circular, ovoid or different cross-sectional shape. The piston 108 has the same, or substantially the same, cross sectional shape as the housing 104 such that a pressure seal can exist between the piston 108 and the housing 104 while allowing translative movement of the piston 108 within the chamber 119. In the example shown in FIGS. 1A-1B, the piston 108 is substantially cylindrical with a circular cross-sectional shape that matches (substantially or wholly) a substantially cylindrical inner sidewall forming a chamber configured to allow translatable motion of the piston 108 within the housing 104. The piston 108 includes an outer groove 130a and an outer groove 130b disposed circumferentially in a substantially cylindrical outer surface of the piston 108. The housing 104 includes an opening 132a and an opening 132b in the sidewall of the housing 104 fluidically connected to a high pressure fluid pathway, an opening 136a and an opening 136b in the sidewall of the housing 104 fluidically connected to a low pressure fluid pathway, an opening 140a in the sidewall of the housing 104 fluidically connected to a first output fluid pathway and an opening 140*b* in the sidewall of the housing 104 fluidically connected to a second output fluid pathway.

The opening 140*a* is positioned in the housing 104 such that when the groove 130*a* in the piston 108 translates as the piston 108 moves axially, fluid in the groove 130*a* remains in fluid communication with the opening 140*a*. The opening 132*a* to the high pressure fluid pathway is spaced apart from and positioned in the sidewall to a first side of the opening 140*a*, and the opening 136*a* to the low pressure fluid pathway is spaced apart from and positioned in the sidewall to a second side of the opening 140*a* to the output fluid pathway in an opposite axial direction from the opening 132*a* to the high pressure fluid pathway. The opening 140*b* is positioned in the housing 104 such that when the groove 130*b* in the piston 108 translates as the piston 108 moves axially, fluid in the groove 130*b* remains in fluid communication with the opening 140*b*. The opening 132*b* to the high pressure fluid pathway is spaced apart from and positioned in the sidewall to a first side of the opening 140*b*, and the opening 136*b* to the low pressure fluid pathway is spaced apart from and positioned in the sidewall to a second side of the opening 140*b* to the output fluid pathway in an opposite axial direction from the opening 132*b* to the high pressure fluid pathway.

The opening 132*a* to the high pressure fluid pathway is positioned in the housing 104 such that when the groove 130*a* in the piston 108 translates as the piston 108 moves axially in a first direction, fluid in the groove 130*a* remains in fluid communication with the opening 136*a* to the low pressure fluid pathway and an outer surface of the piston 108 closes the opening 132*a* to the high pressure fluid pathway. The opening 132*a* to the high pressure fluid pathway is positioned in the housing 104 such that when the groove 130*a* in the piston 108 translates as the piston 108 moves axially in a second direction opposite the first direction, fluid in the groove 130*a* remains in fluid communication with the opening 132*a* to the high pressure fluid pathway and an outer surface of the piston 108 closes the opening 136*a* to the low pressure fluid pathway. The opening 132*b* to the high pressure fluid pathway is positioned in the housing 104 such that when the groove 130*b* in the piston 108 translates as the piston 108 moves axially in the second direction, fluid in the groove 130*b* remains in fluid communication with the opening 136*b* to the low pressure fluid pathway and an outer surface of the piston 108 closes the opening 132*b* to the high pressure fluid pathway. The opening 132*b* to the high pressure fluid pathway is positioned in the housing 104 such that when the groove 130*b* in the piston 108 translates as the piston 108 moves axially in the first direction opposite the second direction, fluid in the groove 130*b* remains in fluid communication with the opening 132*b* to the high pressure fluid pathway and an outer surface of the piston 108 closes the opening 136*b* to the low pressure fluid pathway.

In some instances, one or both of the openings 140*a* and 140*b* can be fluid outputs. In some instances, one or both of the openings 140*a* and 140*b* can be operably connected to a fluid drive system, for example, a hydraulic actuator (e.g., a linear actuator, a rotary piston actuator, a rotary vane actuator, a fluid motor). The hydraulic actuator may be used to mechanically move an element of a device from a first position to a second position. By way of example and not limitation, the hydraulic output may be used to move an object (e.g. piston, actuator, fuel nozzle, etc.) on an aircraft from a first position to a second position and to intermediate positions therebetween.

Still referring to FIGS. 1A and 1B, the example servo valve 100 includes the lockout assembly 150. The lockout assembly 150 includes moveable housing end 152 configured to translate axially within the open end 138 the housing 104. A seal 154 provides a fluid seal between the moveable housing end 152 and the open end 138. The lockout assembly 150 also includes a stop in the form of a rotary cam 156 and a lever arm 158. The rotary cam 156 is configured to pivot eccentrically about an axis 157 to selectively partially extend and retract in the axial direction of the moveable housing end 152. In some embodiments, the servo valve 100 may be another form of fluid control valve, such as a solenoid valve.

Referring now to FIG. 1A, the lockout assembly 150 is shown in an unlocked configuration. The rotary cam 156 is positioned such that the eccentricity of the rotary cam 156 causes the rotary cam 156 to extend from the axis 157 substantially away from the open end 138. The moveable housing end 152 is able to translate axially within the open end 138 toward the axis 157 and away from the piston 108. In some embodiments, the moveable housing end 152 may be urged into contact with the rotary cam 156 by axial movement of the piston 108. In the present example configuration, the piston 108 is able to move axially within the housing 104 between the first and second position without mechanical interference from the moveable housing end 152. In the unlocked configuration, a receptacle 160*a* (e.g., a bolt hole) aligns with a bore (not shown) in the lever arm 158. A fastener 162 (e.g., a bolt, set screw) passes through the bore and into the receptacle 160*a* to reversibly secure the lever arm 158 and the rotary cam 156 in the unlocked configuration.

Referring now to FIG. 1B, the lockout assembly 150 is shown in a locked configuration. The rotary cam 156 is rotated such that the eccentricity of the rotary cam 156 causes the rotary cam 156 to extend from the axis 157 substantially toward the open end 138. The moveable housing end 152 translate axially within the open end 138 away from the axis 157 and urges the piston 108 into a predetermined one of the first or the second directions. The fastener 162 (e.g., a bolt, set screw) passes through the bore and into a receptacle 160*b* to reversibly secure the lever arm 158 and the rotary cam 156 in the locked configuration.

In the locked configuration, the piston 108 is mechanically held in a predetermined position. In some implementations, the locked configuration can cause the piston 108 to create a fluid circuit from one or both of the openings 132*a*-132*b* (e.g., the high pressure fluid pathway) to the corresponding opening 140*a*-140*b*. In some implementations, the locked configuration can cause the piston 108 to create a fluid circuit from one or both of the openings 136*a*-136*b* (e.g., the low pressure fluid pathway) to the corresponding opening 140*a*-140*b*. In some implementations, by locking the servo valve 100, a supply of high pressure and/or low pressure fluid may be supplied, for example to a fluid actuator, substantially overriding the ability of the servo valve 100 to vary the fluid pressure at one or both of the openings 140*a*-140*b*.

Figure 2B:
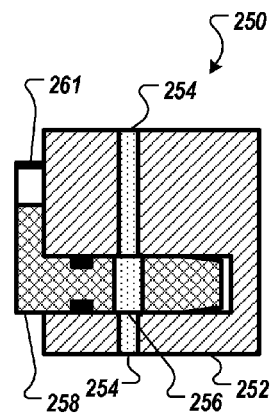
FIGS. 2A-2D are cross-sectional views of another example servo valve with another example lockout assembly in an unlocked configuration and a locked-out configuration, respectively.
Figure 2A:
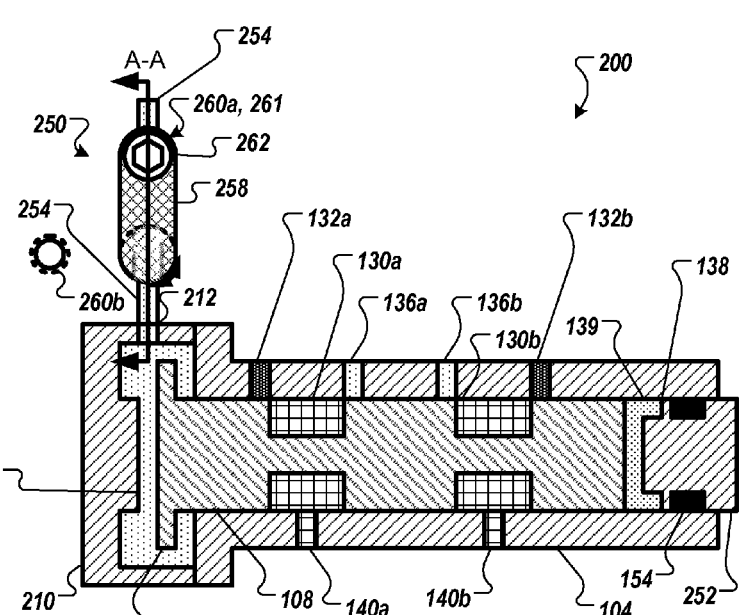
Figure 2D:
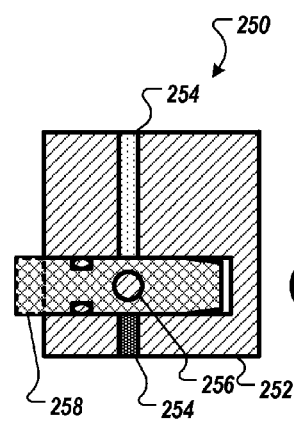
Figure 2C:
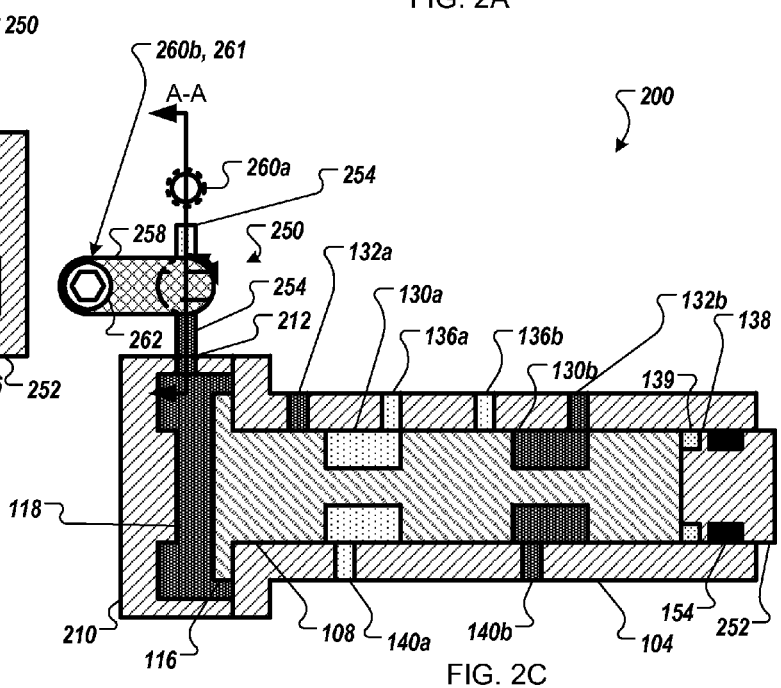

FIGS. 2A and 2C are cross-sectional views of another example servo valve 200 with another example lockout assembly 250 in an unlocked configuration and a locked-out configuration, respectively. FIGS. 2B and 2D are cross-sectional views of the lockout assembly 250 in an unlocked configuration and a locked-out configuration, respectively, taken across the section identified as A-A.

The example servo valve 200 includes the piston housing 104, the piston 108 disposed in the housing 104, and a fluid chamber housing 210. The piston 108 is fluidly connected on the first end 116 to the first fluid pressure chamber 118, and the piston 108 is fluidly connected on the second end 138 to the second fluid pressure chamber 139. The piston 108 is configured to translate axially within the housing 104 in response to a pressure of a first fluid in the first fluid pressure chamber 118 and/or the pressure of a second fluid in the second fluid pressure chamber 139.

The fluid chamber housing 210 includes an opening 212 in fluid communication with a fluid path 254. In some embodiments, the fluid path 254 can be a fluid inlet through which a pressurized fluid can be applied to pressurize the first fluid pressure chamber 118 to urge movement of the piston 108. In some embodiments, the fluid path 254 can be a fluid outlet through which a pressurized fluid can escape the first fluid pressure chamber 118 to permit movement of the piston 108. In some embodiments, the first fluid pressure chamber 118 can be fluidly connected to the opening 132a and/or 132b, such that a supply of high pressure fluid can flow into and pressurize the first fluid chamber 118 to urge movement of the piston 108.

In some instances, one or both of the openings 140a and 140b can be fluid outputs. In some instances, one or both of the openings 140a and 140b can be operably connected to a fluid drive system, for example, a hydraulic actuator (e.g., a linear actuator, a rotary piston actuator, a rotary vane actuator, fluid motor). The hydraulic actuator may be used to mechanically move an element of a device from a first position to a second position. By way of example and not limitation, the hydraulic output may be used to move an object (e.g. piston, actuator, fuel nozzle, etc.) on an aircraft from a first position to a second position and to intermediate positions there between.

The servo valve 200 includes the lockout assembly 250. The lockout assembly 250 includes a valve housing 252 and a valve 256. The valve 256 is configured to selectively open or block the fluid path 254. A lever arm 258 is connected to and configured to open and close the valve 256.

Referring now to FIGS. 2A and 2B, the example servo valve 200 is shown in an unlocked configuration. The valve 256 is positioned to permit a fluid flow through the fluid path 254. In the unlocked configuration, fluid in the first fluid chamber 118 can escape through the fluid path 254 as the first end 116 of the piston 108 is urged into the fluid chamber housing 210. In the unlocked configuration, a receptacle 260a (e.g., a bolt hole) aligns with a bore 261 in the lever arm 258. A fastener 262 (e.g., a bolt, set screw) passes through the bore and into the receptacle 260a to reversibly secure the lever arm 258 and the valve 256 in the unlocked configuration.

Referring now to FIGS. 2C and 2D, the example lockout assembly 250 is shown in a locked configuration. The valve 256 is positioned to block a fluid flow through the fluid path 254. In the locked configuration, fluid in the first fluid chamber 118 cannot escape through the fluid path 254 as the first end 116 of the piston 108 is urged into the fluid chamber housing 210. In some embodiments, the first fluid chamber 118 may be in fluid communication with a high pressure fluid path, e.g., though the openings 132a or 132b. In such embodiments, fluid pressure will build up within the first fluid chamber 118 since the fluid path 254 is blocked, and the pressure will urge movement of the first end 116 partly away from the fluid chamber housing 210 and hold the piston 108 in that position hydraulically until the lockout assembly 250 is reconfigured to the unlocked configuration. In locked configuration, the openings 140a and/or 104b may be kept at a preselected one of high pressure or low pressure. The fastener 262 (e.g., a bolt, set screw) passes through the bore 261 and into a receptacle 260b to reversibly secure the lever arm 258 and the valve 256 in the locked configuration.

Figure 3A:
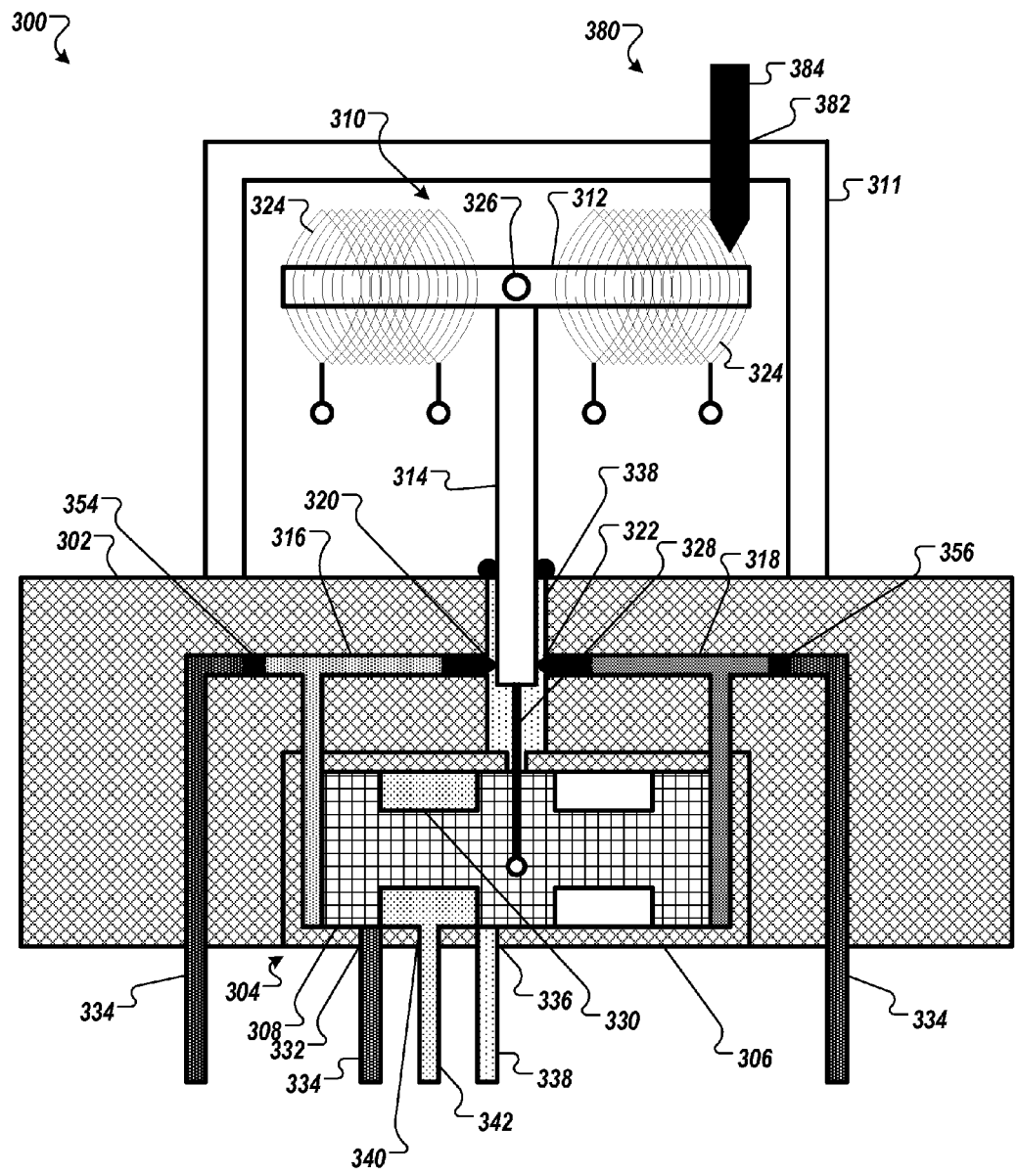
FIGS. 3A and 3B are cross-sectional views of an example electrohydraulic servo valve with an example lockout assembly in an unlocked configuration and a locked-out configuration, respectively.
Figure 3B:
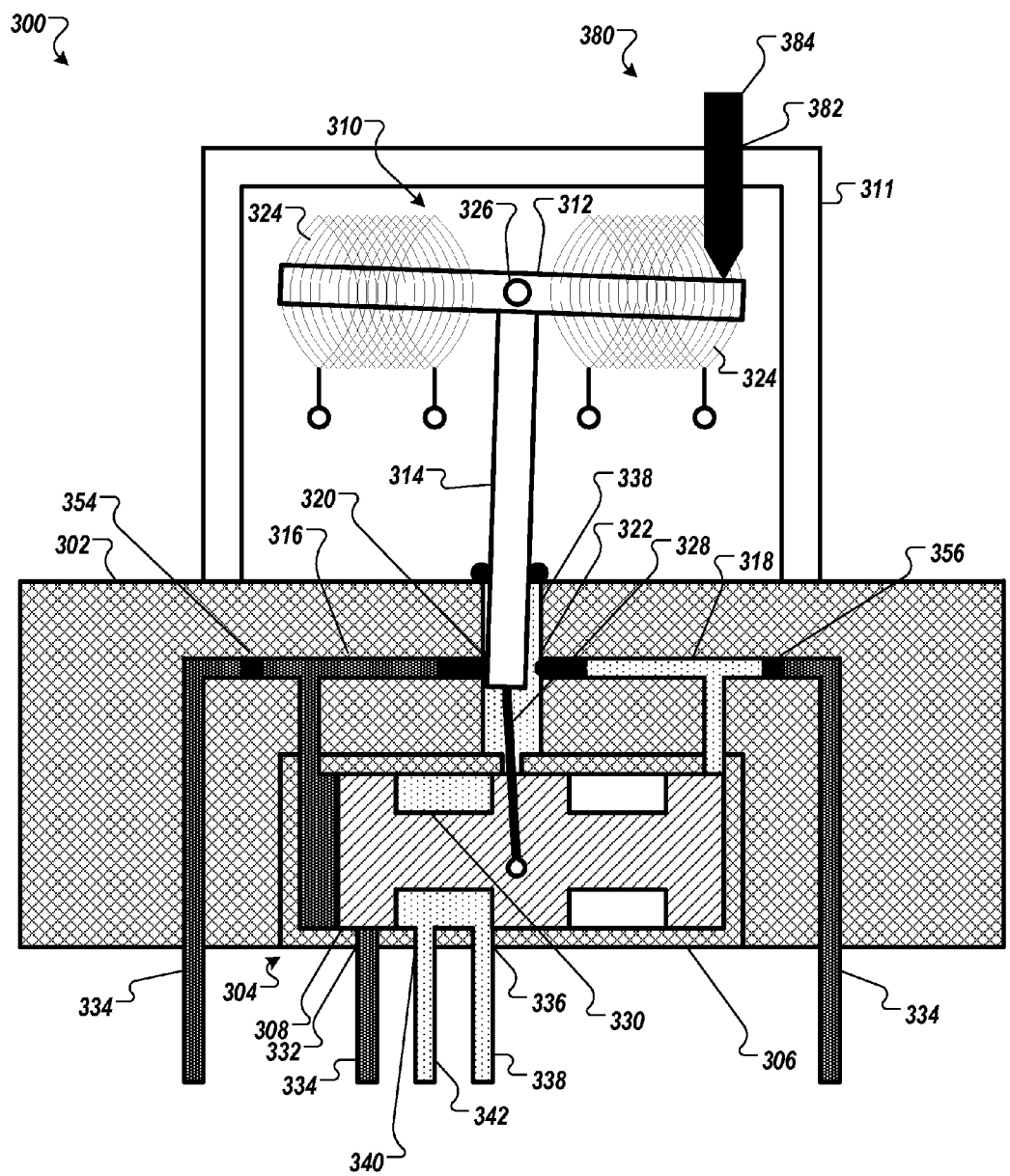

FIGS. 3A and 3B are cross-sectional views of an example electrohydraulic servo valve ("EHSV") 300 with an example lockout assembly 380 in an unlocked configuration and a locked-out configuration, respectively. The EHSV 300 includes a valve housing 302, a piston cylinder 304, a piston 308 disposed in the cylinder 304, and a flapper assembly 310 with an activation portion 312 and a closure portion 314. The activation portion 312 is substantially enclosed within a housing 311. It will be understood that the sleeve 306 is not a required element for implementation of this disclosure. In alternate embodiments, the piston 308 may be disposed directly in a bore of the piston cylinder 304. The piston 308 is fluidly connected on a first end to a first fluid pressure chamber 316, and is fluidly connected on a second end to a second fluid pressure chamber 318. The piston 308 is configured to translate axially within the sleeve 306 in response to a pressure differential between a first fluid in the first fluid pressure chamber 316 and a second fluid in the second fluid pressure chamber 318. The closure portion 314 of the flapper assembly 310 extends from the activation portion 312, and the flapper assembly 310 is configured to move the closure portion 314. In some instances, the flapper assembly 310 is configured to move the closure portion 314 to engage a first fluid flow control element 320 on the first fluid pressure chamber 316 when the closure portion 314 is in a first position, and is configured to move the closure portion 314 to engage a second fluid flow control element 322 on the second fluid pressure chamber 318 when the closure portion 314 is in a second position.

In certain instances, the first fluid flow control element 320 includes a first nozzle in the first fluid pressure chamber 316, and the second fluid flow control element 322 includes a second nozzle in the second fluid pressure chamber 318. The first nozzle is configured to seal against the closure portion 314 of the flapper assembly 310 when the closure portion 314 engages with the first nozzle in the first position. Similarly, the second nozzle is configured to seal against the closure portion 314 of the flapper assembly 310 when the closure portion 314 engages with the second nozzle in the second position. In other instances, the fluid flow control elements 320 and 322 include other, different flow control features.

The activation portion 312 of the flapper assembly 310 can be implemented in various manners. For example, the activation portion 312 can include a pressure activated diaphragm, a linear actuator, a pneumatic actuator, a servo motor, an armature with electrified coils about ends of the armature, and/or a different activation component. In the example shown in FIGS. 3A-3B, the example EHSV 300 includes two electrical coils 324 disposed proximal to the activation portion 312 of the flapper assembly 310. The flapper assembly 310 is movably attached to the housing 302, for example, by a pivot spring 326 configured to resist rotation of the flapper assembly 310. In the example shown in FIGS. 3A-3B, the two electrical coils 324 coil about opposite ends of the activation portion 312. In some instances, an electrical input, such as an input voltage or current, to the electrical coils 324 produces an electromagnetic force that results in a torque acting on the activation portion 312 to rotate the closure portion 314 to a specific position. In certain instances, the pivot spring 326 is configured to resist rotation of the flapper assembly 310 while the electrical coils 324 promote rotation of the flapper assembly 310, such that the rotation of the flapper assembly 310 is proportional to the electrical input to the electrical coils 324. The example EHSV 300 can include a different number of coils 324, for example, one coil, or three or more coils. In some instances, the coils 324 can include a solenoid, coiled copper wire, and/or other electrical components.

In some instances, the EHSV 300 includes a feedback spring 328 connected to the closure portion 314 of the flapper assembly 310 on one end and the piston 308 on another end. The feedback spring 328 is configured to provide a force balance between the piston 308 and the flapper assembly 310. For example, the piston 308 translates until torque on the flapper assembly 310 from the feedback spring 328 balances torque on the flapper assembly 310 applied by the electrical input of the electrical coils 324.

In some instances, an outer periphery portion of the piston 308 pressure-seals against an inner surface of the sleeve 306 such that the first fluid in the first fluid pressure chamber 316 is separated from the second fluid in the second fluid pressure chamber 318. For example, peripheries of the opposite ends of the piston 308 can seal against the sleeve 306 such that the first fluid is retained on one end of the sleeve 306 against a first end of the piston 308, and the second fluid is retained on an opposite end of the sleeve 306 against a second, opposite end of the piston 308. Pressure differentials between the first fluid and the second fluid can actuate the piston 308 to translate within the sleeve 306.

The cross-sectional shape of the piston 308 and sleeve 306 can vary. For example, the piston 308 and sleeve 306 can each have a rectangular, square, circular, ovoid or different cross-sectional shape. The piston 308 has the same, or substantially, the same, cross sectional shape as the sleeve 306 such that a pressure seal can exist between the piston and the sleeve while allowing translative movement of the piston 308 within the sleeve 306. In an alternative embodiment without a sleeve 306, the piston cylinder 304 will be configured with a cross-section to slidably receive the piston 308 of a non-cylindrical cross-section. In the example shown in FIGS. 3A-3B, the piston 308 is substantially cylindrical with a circular cross-sectional shape that matches (substantially or wholly) a substantially cylindrical inner sidewall of the sleeve 306. The piston 308 includes an outer groove 330 disposed circumferentially in a substantially cylindrical outer surface of the piston 308. The sleeve 306 includes an opening 332 in the sidewall of the sleeve 306 fluidically connected to a high pressure fluid pathway 334, an opening 336 in the sidewall of the sleeve 306 fluidically connected to a low pressure fluid pathway 338, and an opening 340 in the sidewall of the sleeve 306 fluidically connected to an output fluid pathway 342. The opening 340 to the output fluid pathway 342 is positioned in the sleeve 306 such that when the groove 330 in the piston 308 translates as the piston 308 moves axially, fluid in the groove 330 remains in fluid communication with the opening 340 to the output fluid pathway 342. The opening 332 to the high pressure fluid pathway 334 is spaced apart from and positioned in the sidewall to a first side of the opening 340 to the output fluid pathway 342, and the opening 336 to the low pressure fluid pathway 338 is spaced apart from and positioned in the sidewall to a second side of the opening 340 to the output fluid pathway 342 in an opposite axial direction from the opening 332 to the high pressure fluid pathway 334. The opening 332 to the high pressure fluid pathway 334 is positioned in the sleeve 306 such that when the groove 330 in the piston 308 translates as the piston 308 moves axially in a first direction, fluid in the groove 330 remains in fluid communication with the opening 336 to the low pressure fluid pathway 338 and an outer surface of the piston 308 closes the opening 332 to the high pressure fluid pathway 334 (See FIG. 3B). The opening 336 to the high pressure fluid pathway 334 is positioned in the sleeve 306 such that when the groove 330 in the piston 308 translates as the piston 308 moves axially in a second direction opposite the first direction, fluid in the groove 330 remains in fluid communication with the opening 332 to the high pressure fluid pathway 334 and an outer surface of the piston 308 closes the opening 336 to the low pressure fluid pathway 338.

In some instances, the output fluid pathway 342 can be operably connected to a fluid drive system, for example, a hydraulic actuator. The hydraulic actuator may be used to mechanically move an element of a device from a first position to a second position. By way of example and not limitation, the hydraulic output may be used to move an object (e.g. piston, actuator, fuel nozzle, etc.) on an aircraft from a first position to a second position and to intermediate positions there between.

In the example EHSV 300 shown in FIGS. 3A-3B, the first fluid pressure chamber 316 is connected on one end to the high pressure fluid pathway 334 via a first pressure change element 354, and connected on another end to the low pressure fluid pathway 338 via the first fluid flow control element 320. The second fluid pressure chamber 318 is connected on one end to the high pressure fluid pathway 334 via a second pressure change element 356 and on another end to the low pressure fluid pathway 338 via the second fluid flow control element 322, with an intermediate section extending into the sleeve 306 proximate the second end of the piston 308. The first pressure change element 354 regulates pressure between fluid in the high pressure fluid pathway 334 and fluid in the first fluid pressure chamber 316 based on fluid flow through the first pressure change element 354. Similarly, the first fluid flow control element 320 regulates pressure between fluid in the low pressure fluid pathway 338 and fluid in the first fluid pressure chamber 316. For example, the first pressure change element 354 creates a pressure drop between the high pressure fluid pathway 334 and first fluid pressure chamber 316, and the first fluid flow control element 320 creates a pressure drop between the first fluid pressure chamber 316 and the low pressure fluid pathway 338, such that fluid in the first fluid pressure chamber 316 is at an intermediate pressure between the higher pressure in the high pressure fluid pathway 334 and the lower pressure in the low pressure fluid pathway 338. The second pressure change element 356 regulates pressure between fluid in the high pressure fluid pathway 334 and fluid in the second fluid pressure chamber 318 based on fluid flow through the second pressure change element 356. Similarly, the second fluid flow control element 322 regulates pressure between fluid in the low pressure fluid pathway 338 and fluid in the second fluid pressure chamber 318. For example, the second pressure change element 356 creates a pressure drop between the high pressure fluid pathway 334 and second fluid pressure chamber 318, and the second fluid flow control element 322 creates a pressure drop between the second fluid pressure chamber 318 and the low pressure fluid pathway 338, such that fluid in the second fluid pressure chamber 318 is at an intermediate pressure between the higher pressure in the high pressure fluid pathway 334 and the lower pressure in the low pressure fluid pathway 338. The first pressure change element 354 and second pressure change element 356 can each include a hydraulic bridge with an orifice, where the orifice is adapted to regulate pressure based on fluid flow through the orifice, for example, fluid flow from the high pressure fluid pathway 334 through the orifice and to the first fluid pressure chamber 316, or fluid flow from the high pressure fluid pathway 334 through the orifice and to the second fluid pressure chamber 318.

The lockout assembly 380 includes a bore 382 formed in the housing 311. A stop 384 in the form of a rod, bolt, or any other appropriate shape can be passed through the bore 382 to contact the flapper assembly 310. For example, the bore 382 may be threaded and the stop 384 may be a bolt threaded to mate with the bore 382, and the stop 384 may be threaded into and out of the bore 382 to reversibly bring the stop 384 into and out of contact with the flapper assembly 310. In the illustrated example, the stop 384 is configured to contact the activation portion 312. In some embodiments, the stop 384 can be configured to contact the closure portion 314.

Referring now to FIG. 3A, the example lockout assembly 380 is shown in an unlocked configuration. In the unlocked configuration, the stop 384 does not interfere with the operation of the flapper assembly 310.

Referring now to FIG. 3B, the example lockout assembly 380 is shown in a locked configuration. In the locked configuration, the stop 384 contacts the flapper assembly 310. When in contact with the flapper assembly 310, the stop 384 mechanically interferes with the ability of the flapper assembly 310 to move. The stop 384 reversibly fixes the flapper assembly 310 in a position such that the closure portion 314 engages a selected one of the first fluid control element 320 or the second fluid control element 322. In the illustrated example, the stop 384 contacts the activation portion 310 to urge the closure portion 314 into the first position and engage the first fluid control element 320. Flow of fluid through the first fluid control element 320 is impeded, causing pressure to build within first fluid pressure chamber 316 to urge the piston 308 to move axially in the first direction. Fluid in the groove 330 remains in fluid communication with the opening 336 to the low pressure fluid pathway 338 and an outer surface of the piston 308 closes the opening 332 to the high pressure fluid pathway 334. The opening 336 to the high pressure fluid pathway 334 is positioned in the sleeve 306 such that when the groove 330 in the piston 308 translates as the piston 308 moves axially in a second direction opposite the first direction, fluid in the groove 330 remains in fluid communication with the opening 332 to the high pressure fluid pathway 334 and an outer surface of the piston 308 closes the opening 336 to the low pressure fluid pathway 338.

In some instances, the output fluid pathway 342 can be operably connected to a fluid drive system, for example, a hydraulic actuator. By configuring the lockout assembly 380 in the locked configuration, the action of the servo valve may be selectably overridden to cause a selected high or low pressure fluid to be applied to the fluid drive system, which in turn can be used to urge the fluid drive system into a reversibly fixed mechanical position.

Figure 4A:
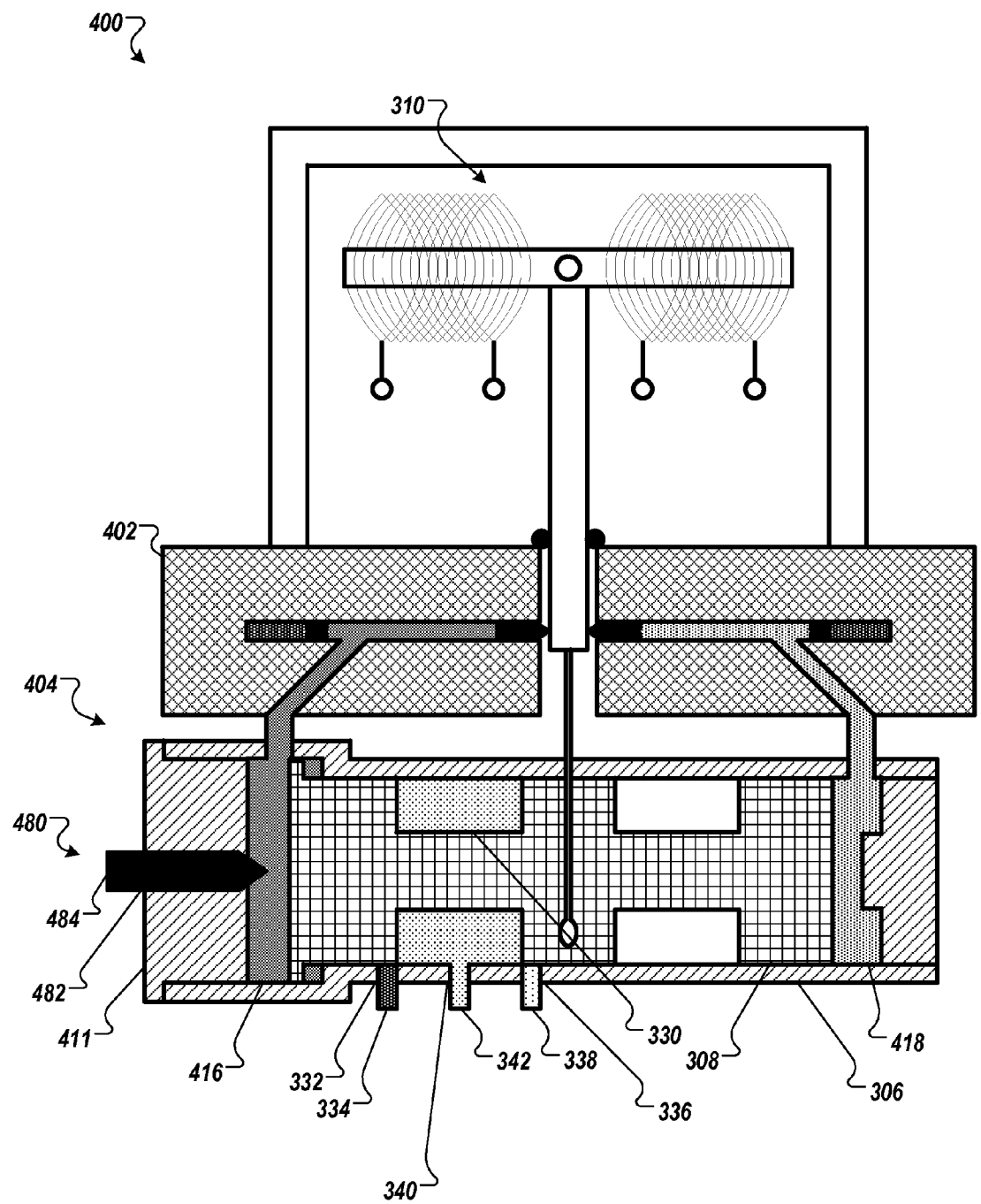
FIGS. 4A and 4B are cross-sectional views of another example electrohydraulic servo valve with another example lockout assembly in an unlocked configuration and a locked-out configuration, respectively.
Figure 4B:
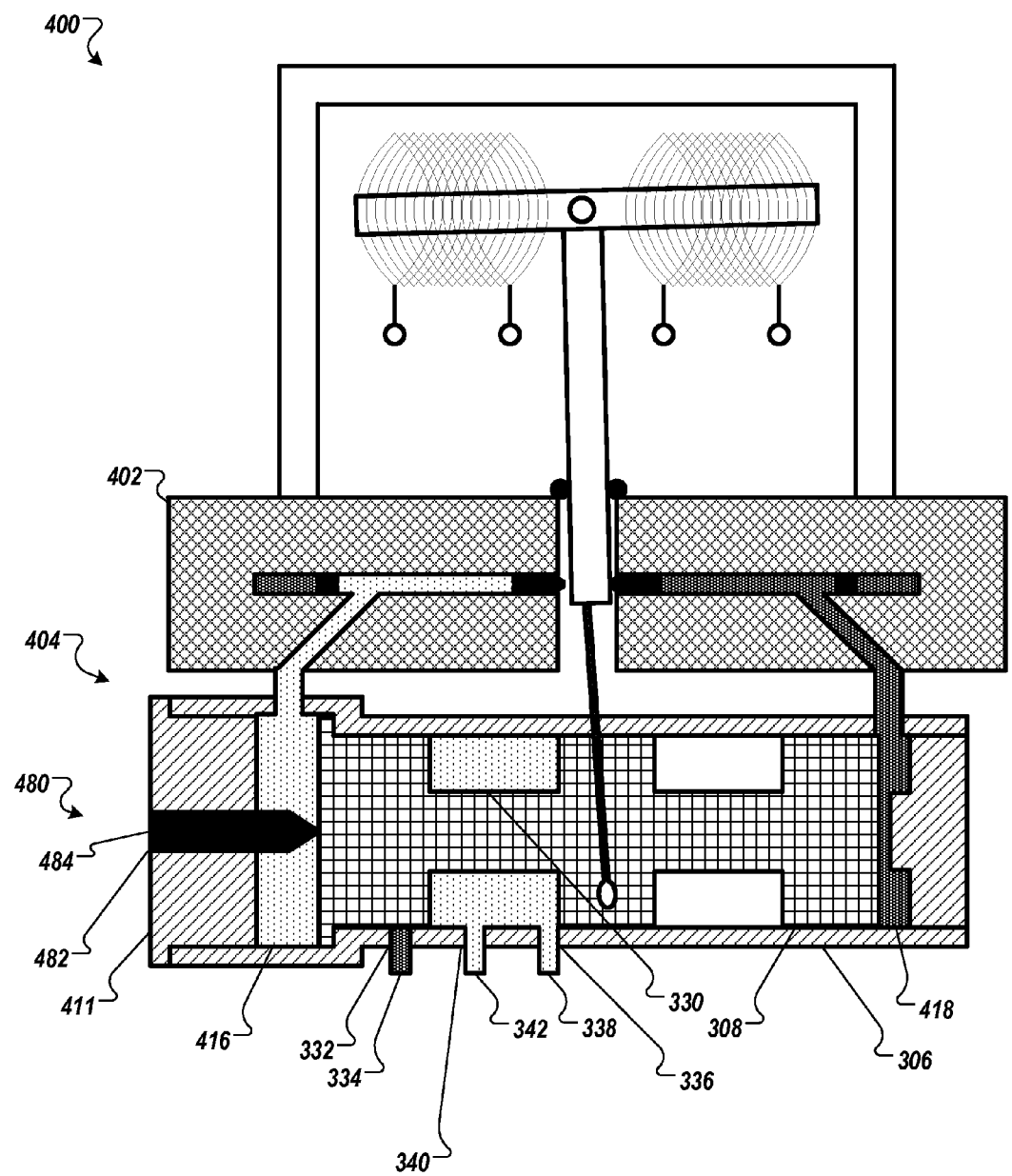

FIGS. 4A and 4B are cross-sectional views of another example electrohydraulic servo valve ("EHSV") 400 with another example lockout assembly 480 in an unlocked configuration and a locked-out configuration, respectively. The EHSV 400 includes a valve housing 402, a piston cylinder 404, the piston 308 of FIGS. 3A-3B disposed in the cylinder 404, and the flapper assembly 310. The piston 308 is fluidly connected on a first end to a first fluid pressure chamber 316, and is fluidly connected on a second end to a second fluid pressure chamber 318. The piston 308 is configured to translate axially within the sleeve 306 in response to a pressure differential between a first fluid in a first fluid pressure chamber 416 and a second fluid in a second fluid pressure chamber 418. The piston cylinder 404 includes the opening 332 in the sidewall of the piston cylinder 404 fluidically connected to the high pressure fluid pathway 334, the opening 336 in the sidewall of the piston cylinder 404 fluidically connected to a low pressure fluid pathway 338, and the opening 340 in the sidewall of the piston cylinder 404 fluidically connected to the output fluid pathway 342.

The opening 340 to the output fluid pathway 342 is positioned in the piston cylinder 404 such that when the groove 330 in the piston 308 translates as the piston 308 moves axially, fluid in the groove 330 remains in fluid communication with the opening 340 to the output fluid pathway 342. The opening 332 to the high pressure fluid pathway 334 is spaced apart from and positioned in the sidewall to a first side of the opening 340 to the output fluid pathway 342, and the opening 336 to the low pressure fluid pathway 338 is spaced apart from and positioned in the sidewall to a second side of the opening 340 to the output fluid pathway 342 in an opposite axial direction from the opening 332 to the high pressure fluid pathway 334. The opening 332 to the high pressure fluid pathway 334 is positioned in the sleeve 306 such that when the groove 330 in the piston 308 translates as the piston 308 moves axially in a first direction, fluid in the groove 330 remains in fluid communication with the opening 336 to the low pressure fluid pathway 338 and an outer surface of the piston 308 closes the opening 332 to the high pressure fluid pathway 334 (See FIG. 4B). The opening 336 to the high pressure fluid pathway 334 is positioned in the sleeve 306 such that when the groove 330 in the piston 308 translates as the piston 308 moves axially in a second direction opposite the first direction, fluid in the groove 330 remains in fluid communication with the opening 332 to the high pressure fluid pathway 334 and an outer surface of the piston 308 closes the opening 336 to the low pressure fluid pathway 338.

In some instances, the output fluid pathway 342 can be operably connected to a fluid drive system, for example, a hydraulic actuator. The hydraulic actuator may be used to mechanically move an element of a device from a first position to a second position. By way of example and not limitation, the hydraulic output may be used to move an object (e.g. piston, actuator, fuel nozzle, etc.) on an aircraft from a first position to a second position and to intermediate positions there between.

The example lockout assembly 480 includes a bore 482 formed in and end cap 411 which provides a wall of the first fluid pressure chamber 416. A stop 484 in the form of a rod, bolt, set screw, or any other appropriate shape can be passed through the bore 482 and the first fluid pressure chamber 416 to contact the piston 308. For example, the bore 482 may be threaded and the stop 484 may be a bolt threaded to mate with the bore 482, and the stop 484 may be threaded into and out of the bore 482 to reversibly bring the stop 484 into and out of contact with the piston 408. In some embodiments, a seal may be provided between the stop 484 and the bore 482 to resist leakage of fluid from the first fluid pressure chamber 416.

Referring now to FIG. 4A, the example lockout assembly 480 is shown in an unlocked configuration. In the unlocked configuration, the stop 484 does not interfere with the axial translation of the piston 408.

Referring now to FIG. 4B, the example lockout assembly 480 is shown in a locked configuration. In the locked configuration, the stop 484 contacts the piston 408, urging the piston 408 in the first direction and reversibly fixing the piston 408 at a predetermined axial position.

When in contact with the piston 408, the stop 484 mechanically interferes with the ability of the piston 408 to move. The stop 484 reversibly fixes the piston 408 in the first direction such that low pressure fluid pathway 338 is in fluidic communication with the output fluid pathway 342 through the groove 330. In some embodiments, the lock assembly 480 can be configured to reversibly fix the piston 408 in the second direction. In some embodiments, the lock assembly 480 and the EHSV 400 can be configured to provide high pressure fluid at the output fluid pathway 342 when in the locked configuration. In some embodiments, the lock assembly 480 and the EHSV 400 can be configured to provide low pressure fluid at the output fluid pathway 342 when in the locked configuration.

In some embodiments, the lockout assembly 480 can have other forms. For example, the lockout assembly 150 of FIGS. 1A-1B may be used in place of the lockout assembly 480. Likewise, in some embodiments, the lockout assembly 150 of the servo valve 100 may be replaced with the lockout assembly 480.

Figure 5:
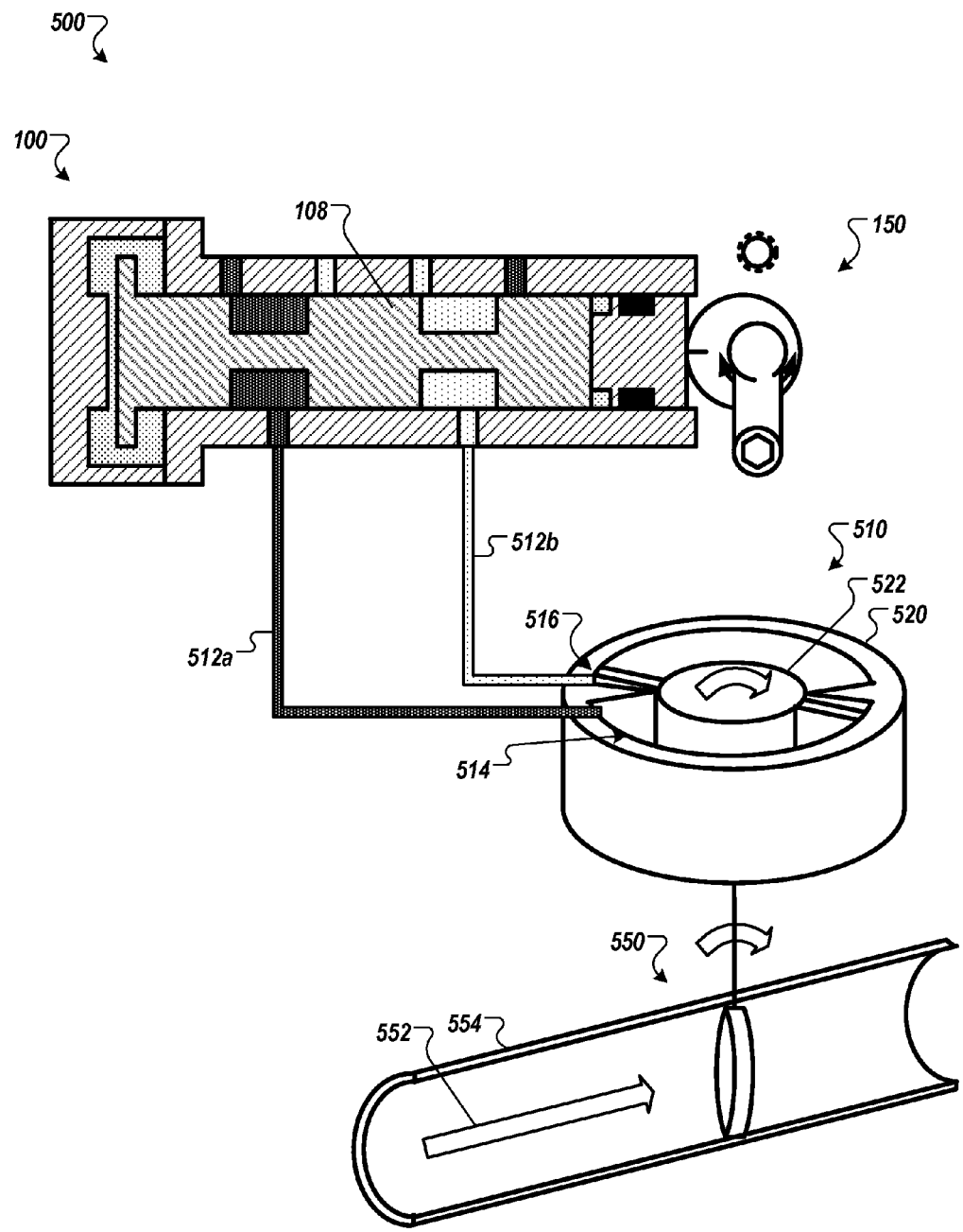
FIG. 5 is a diagram of an example multi-stage fluid control system with an example lockout assembly.

FIG. 5 is a diagram of an example multi-stage fluid control system 500 with an example lockout assembly. The system 500 includes the servo valve 100 of FIGS. 1A-1B, which includes the lockout assembly 150. In some embodiments, the servo valve 100 and the lockout assembly 150 can be substituted in the system 500 by any of the servo valve 200 and the lockout assembly 250 of FIGS. 2A-2D, the EHSV 300 and the lockout assembly 380 of FIGS. 3A-3B, the EHSV of FIGS. 4A-4B and the lockout assembly 480, or any appropriate combination of servo valves 100, 200, 300, 400 and the lockout assemblies 150, 250, 380, 480.

As shown in FIG. 5, the servo valve 100 is configured as a fluid control device, which provides fluids at controllably variable pressures to a fluid actuator 510 through a fluid conduit 512a and a fluid conduit 512b. The fluid actuator 510 includes a stator portion 520 and an actuator portion 522. The actuator portion 522 is configured to actuate a fluid control apparatus 550. The fluid control apparatus 550 is configured to control a flow of fluids, represented by the arrow 552, flowing through a conduit 554 at a pressure, temperature, and/or rate that is too high for the servo valve 100 to control directly.

The fluid actuator 510 amplifies the fluid power provided by the servo valve 100. For example, some servo valve designs are not well-suited for controlling high fluid flow, high fluid temperature, or high fluid pressure applications directly. In such examples, a servo valve can provide a relatively lower pressure fluid supply to an external fluid actuator such as the actuator 510, the action of which can be used to operate the fluid control apparatus 550.

When the lockout assembly 150 is in the unlocked configuration (not shown), the servo valve 100 operates normally, providing controllably varying fluid pressures to the fluid actuator 510 through the fluid conduits 512a-512b. The varying pressures urge actuation of the actuator 510, and actuation of the actuator 510 urges actuation of the fluid control apparatus 550. As such, the positioning and movement of the piston 108 within the servo valve 100 indirectly controls the position and/or configuration of the fluid control apparatus 550.

When the lockout assembly 150 is in the locked configuration, as shown in FIG. 5, the operation of the servo valve is overridden to reversibly fix the piston 108 in a predetermined location (e.g., a hard stop at the end of travel in the first direction or the second direction). With the piston 108 held in the predetermined position, the fluid in the fluid conduits 512a-512b will be held at a substantially constant pressure. This pressure will urge the fluid actuator into a predetermined configuration.

In some embodiments, the fluid actuator 510 can be a linear piston actuator, a rotary piston actuator (RPA), a rotary vane actuator (RVA), a fluid motor, or any other appropriate form of fluid actuator. For example, a linear actuator can be urged into a fully extended or fully retracted position. In another example, a rotary actuator can be urged to a hard-stopped clockwise or counterclockwise rotational position. In yet another example, a fluid motor can be urged into constant rotation in a predetermined direction. The actuator 510 is actuated (e.g., extended, rotated) in a first direction by an application of a pressurized fluid, provided through the fluid conduit 512a, to a fluid chamber 514. The actuator 510 is actuated in a second direction by an application of a pressurized fluid, provided through the fluid conduit 512b, to a fluid chamber 516. In some embodiments, the force used to actuate the actuator 510 in the first or second direction may be provided by a spring, gravity, compressible fluid, or any other appropriate source of mechanical force.

In some embodiments, the fluid control apparatus 550 can be a fluid valve, a fluid flow regulator, a fluid pressure regulator, a diverter, a manifold, or any other appropriate device that may controllably alter the behavior of a fluid. When the lockout apparatus 150 is in the unlocked configuration, the fluid actuator 510 can actuate the fluid control apparatus to controllably vary the flow 552 through the conduit 554. When the lockout assembly 150 is in the locked configuration, the fluid actuator 510 is urged into a predetermined configuration, which in turn urges the fluid control apparatus 550 into a predetermined configuration. In some embodiments, the locked configuration may cause the fluid control apparatus 550 be configured in a substantially "wide open" (e.g., full pressure and/or flow) or "closed shut" in which the flow 552 through the conduit 554 is substantially blocked. In other embodiments, the locked configuration can cause the fluid control apparatus 550 to be urged into any appropriate fluid flow configuration.

In some implementations, the example system 500 may be used in an aircraft or other vehicular application. For example, the servo valve 100 may be used to indirectly control the fluid control apparatus 550 configured to control a rate or pressure of fuel, coolant, air, or other fluids used in the operation of a turbine engine. In some implementations, the system 500 may be used for locking out a remotely located engine or other function or apparatus. For example, the fluid actuator 510, the conduit 554, and/or the fluid control apparatus 550 (e.g., a valve) may be located deep within a complex assembly such as a jet engine. In such an example, gaining direct access to the actuator 510 and/or the fluid control apparatus 550 (e.g., to lock them out directly or to repair them) may be very difficult and time-consuming, especially if the function they perform is not considered to be flight-critical. In such examples, the servo valve 100 and the lockout assembly 150, configured as the fluid control device of the system 100, may be located remotely from the fluid actuator 510, the conduit 554, and/or the fluid control apparatus 550. For example, the servo valve 100 and the lockout assembly 150 may be located behind a service panel on the exterior of an aircraft and can be easily accessed by a ground crew. In another example, the servo valve 100 and the lockout assembly 150 may be located behind an access panel in the interior of an aircraft and can be easily accessed by the flight crew (e.g., to lock out a function in mid-flight).

In these and other examples, the servo valve 100 may be located relatively far away from the fluid actuator 510, fluidically connected by the fluid conduits 512a-512b.

Figure 6:
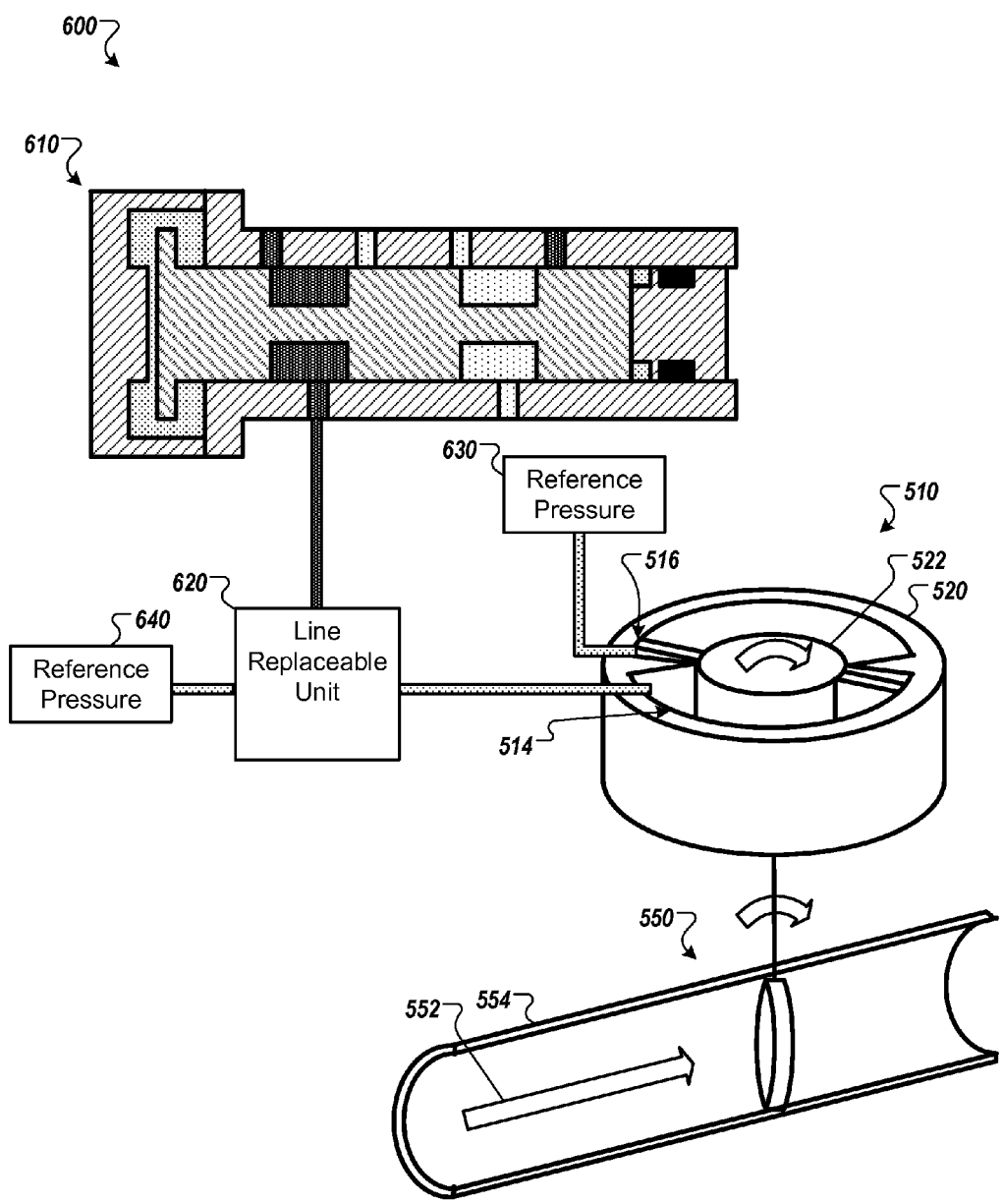
FIG. 6 is a diagram of an example multi-stage fluid control system with an example line-replaceable unit lockout assembly.

FIG. 6 is a diagram of an example multi-stage fluid control system 600 with an example line-replaceable unit LRU lockout assembly 620. The LRU 620 provides lockout functionality similar to that provided by the lockout assemblies 150, 250, 380, 480 of FIGS. 1A-5. In some implementations, the LRU 620 can be an assembly that can be retrofitted into existing multi-stage actuator configurations to provide lockout functionality otherwise lacking in such configurations.

The example system 600 includes a servo valve 610, the fluid actuator 510, and the fluid control apparatus 550. The fluid chamber 516 is pressurized by fluid provided by a first reference pressure source 630 at a first reference pressure and flow. In some embodiments, the first reference pressure and flow can be a predetermined pressure and flow. In some embodiments, the first reference pressure and flow can be greater than zero relative pressure and flow. In some embodiments, the servo valve 610 may be replaced by a solenoid valve, or any other appropriate form of valve.

The fluid chamber 514 is supplied with pressurized fluid flowing through the LRU 620. The LRU is configured to selectively provide the actuator 510 with fluid from the servo valve 610 or from a second reference pressure source 640 at a second reference pressure and flow. In some embodiments, the LRU 620 can be a multi-way valve, select valve, or manifold. Under normal operating conditions, the LRU 620 is configured to block fluid pressure provided by the second reference pressure source 640 and pass a controllably variable fluid pressure controlled by the servo valve 610 to the fluid chamber 514. Fluid pressure and flow in the fluid chamber 514 acts against the fluid pressure in the fluid chamber 516, and the fluid actuator 510 will actuate bidirectionally as the pressure of the fluid controlled by the servo valve 610 varies relative to the pressure and flow of the fluid provided by the first reference pressure source 630. In some embodiments, the second reference pressure and flow can be a predetermined pressure and flow. In some embodiments, the second reference pressure and flow can be greater than zero relative pressure and flow. In some embodiments, the second reference pressure and flow can be greater than the first reference pressure and flow. In some embodiments, the second reference pressure and flow can be less than the first reference pressure and flow.

Under abnormal conditions, such as a malfunction of the servo valve 610, the LRU 620 may be configured to block fluid pressure and flow provided by the servo valve 610 and pass fluid (e.g., at the second pressure) provided by the second reference pressure source 640 to the fluid chamber 514. In some embodiments, the fluid provided by the second reference pressure source 640 will be at a predetermined pressure less than that of the fluid provided by the first reference pressure source 630. In such examples, the fluid actuator 510 and the fluid control apparatus 550 will be urged in a first direction to a first position, substantially blocking or unblocking the flow 552 through the fluid conduit 554 while the LRU 620 is in the locked-out configuration. In some embodiments, the fluid provided by the second reference pressure source 640 will be at a predetermined pressure greater than that of the fluid provided by the first reference pressure source 630. In such examples, the fluid actuator 510 and the fluid control apparatus 550 will be urged in a second direction opposite of the first direction to a second position, substantially blocking or unblocking the flow 552 through the fluid conduit 554 while the LRU 620 is in the locked-out configuration.

In some implementations, the system 600 may be used in an aircraft or other vehicular application. For example, the servo valve 610 may be used to indirectly control the fluid control apparatus 550 configured control a rate or pressure of fuel, coolant, air, or other fluids used in the operation of a turbine engine. In some implementations, the system 600 may be used for locking out a remotely located engine or other function. For example, the servo valve 610, the fluid actuator 510, the conduit 554, and/or the fluid control apparatus 550 (e.g., a valve) may be located deep within a complex assembly such as a jet engine. In such examples, the LRU 620, may be located remotely from the servo valve 610 and/or the fluid actuator 510, the conduit 554, and/or the fluid control apparatus 550. In some implementations, the LRU 620 may be located in an area that is relatively easy to be accessed by ground or flight crews (e.g., behind an access panel). In some implementations, the servo valve 610, may be a different fluid control apparatus such as a solenoid valve.

Figure 7A:
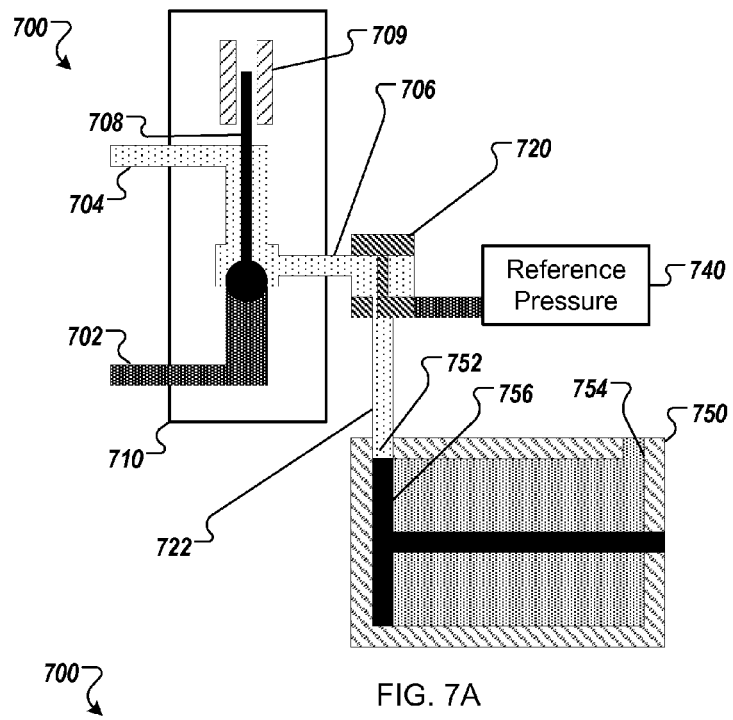
FIGS. 7A and 7B are diagrams of another example multi-stage fluid control system with an example line-replaceable unit lockout assembly.
Figure 7B:
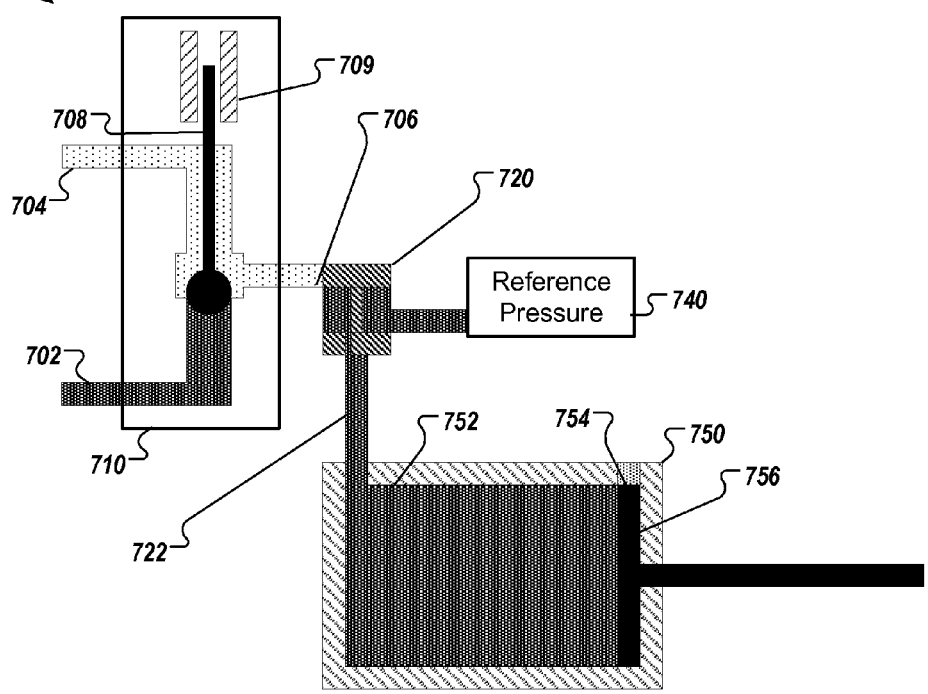

FIGS. 7A and 7B are diagrams of another example multi-stage fluid control system 700 with an example line-replaceable unit lockout assembly 720. In some embodiments, the system 700 can be the system 600 of FIG. 6, and the LRU 720 can be the LRU 620.

The system 700 includes a solenoid valve 710, the LRU 720, and a fluid linear actuator 750. In some embodiments, the solenoid valve 710 can be substituted with a servo valve or any other appropriate type of fluid valve. In some implementations, the fluid linear actuator 750 can be configured to control the fluid control apparatus 550.

The solenoid valve 710 includes a high pressure port 702 connected to a first control fluid source (e.g., high pressure fluid) and a low pressure port 704 connected to a second control fluid source (e.g., low pressure fluid). An outlet port 706 is selectively connected to the high pressure port 702 or the low pressure port 704 by the configuration of a plunger 708 that moves in response to the controlled energizing and de-energizing of an electromagnetic coil 709. The LRU 720 is configured to selectively connect a fluid outlet 722 to a selected one of the outlet port 706 or a fluid reference pressure source 740. In some embodiments, the fluid reference pressure source 740 can be the second fluid reference pressure source 640.

Referring now to FIG. 7A, the LRU 720 is shown in an unlocked configuration. In the unlocked configuration, the LRU 720 provides a fluidic circuit between the outlet port 706 and a fluid chamber 752 of the fluid linear actuator 750. The fluid chamber 752 is separated from a fluid chamber 754 by a piston 756. The piston 756 is urged to extend and retract due to a difference in the pressure of fluid in the fluid chamber 752 and the pressure of fluid in the fluid chamber 754.

Referring now to FIG. 7B, the LRU 720 is shown in a locked configuration. In the locked configuration, the LRU 720 provides a fluidic circuit between the fluid reference pressure source 740 and the fluid chamber 752 of the fluid linear actuator 750. The piston 756 is urged to extend and retract due to a difference in the pressure of the fluid reference pressure source 740 and the pressure of fluid in the fluid chamber 754.

In the illustrated example, the fluid reference pressure source 740 is at a pressure that is greater than that of the fluid in the fluid chamber 754, thereby urging extension of the fluid linear actuator 750 and reversibly locking the actuator 750 in the extended configuration. In another embodiment, the fluid reference pressure source 740 may be at a pressure that is less than that of the fluid in the fluid chamber 754, thereby urging retraction of the fluid linear actuator 750 and reversibly locking the actuator 750 in the retracted configuration. In some embodiments, the fluid linear actuator 750 can be substituted with a fluid rotary vane actuator, a fluid rotary piston actuator, a fluid motor, or any other appropriate fluid-actuated apparatus.

Figure 8:
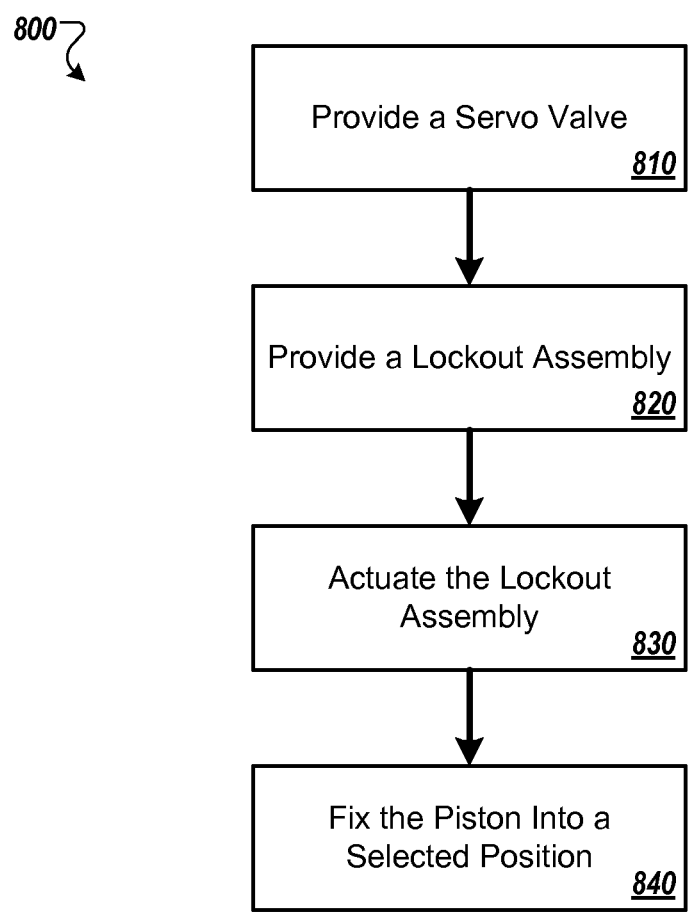
FIG. 8 is a flow diagram of an example process for locking out a hydraulic actuator servo valve.

FIG. 8 is a flow diagram of an example process 800 for locking out a servo valve. In some implementations, the process 800 may be performed using any of the servo valves 100, 200, 300, 400, and 610, or the systems 500, 600, and 700 of FIGS. 1A-7B.

At 810, a valve is provided. For example, the servo valve 100, 200, 300, 400, or 610, or the solenoid valve 710 can be provided. At 820, a lockout assembly is provided. For example, the lockout assembly 150, 250, 380, or 480, or the LRU 620 or 720 can be provided.

At 830, the lockout assembly is actuated into a first configuration. For example, as shown in FIG. 1B, the rotary cam 156 is rotated such that the eccentricity of the rotary cam 156 causes the rotary cam 156 to extend from the axis 157 substantially toward the open end 138. The moveable housing end 152 translates axially within the open end 138 away from the axis 157 and urges the piston 108 into a predetermined one of the first or the second directions.

At 840, the piston is fixed into a selected first position. For example, as shown in FIG. 1B, rotary cam 156 holds the piston 108 in a position in which a fluid circuit from one or both of the openings 132a-132b (e.g., the high pressure fluid pathway) connects to the corresponding opening 140a-140b.

In some implementations, the method 800 can include actuating the lockout assembly into the second configuration, and releasing, by the lockout assembly, the piston from being fixed in the selected position such that the lockout assembly does not interfere with reciprocal axial movement of the piston. For example, in the configuration shown in FIG. 1A, the rotary cam 156 is positioned such that the moveable housing end 152 does not interfere with the axial translative movement of the piston 108.

In some implementations, the method 800 can include contacting the piston with a stop. For example, the lockout assembly 480 includes the stop 484 which can be threaded into the bore 482 to contact the piston 308, and can be threaded out of the bore 482 to not interfere with the axial translative movement of the piston 308.

In some implementations, the process 800 can also include locking the lockout assembly into at least one of the first configuration and the second configuration, where the lockout assembly also includes a lock operable to prevent disengagement of the lockout assembly from at least one of the first configuration and the second configuration. For example, the fastener 162 can be passed through the lever arm 158 and into the receptacle 160a or 160b to secure the lockout assembly 150 in the first configuration or the second configuration.

In some implementations, the method 800 can include preventing the flow of pressurized fluid from the fluid chamber. In some implementations, the method 800 can include allowing the flow of pressurized fluid from the fluid chamber. For example, the lockout assembly 250 can be actuated to selectively allow or prevent fluid from flowing out of the first fluid pressure chamber 118.

In some implementations, the method 800 can include actuating the lockout assembly into the first configuration by threading the fastener through the threaded bore so as to contact the activation portion. For example, the stop 384 can be threaded into the bore 382 to contact flapper assembly 310 and can be threaded out of the bore 382 so as to not interfere with movement of the flapper assembly 310.

In some implementations, the method 800 can include fixing the fluid actuator into a selected fluid actuator position in response to fixing the piston into the selected position. For example, the second stage fluid actuator 510 can be urged into and kept in a selected actuation state, such as extended or retracted, or rotated clockwise or counterclockwise, in response to configuring the lockout assembly 150 in the locked configuration.

In some implementations, the method 800 can include providing a high-capacity fluid valve having a fluid control portion coupled to the actuator portion, and fixing, in response to fixing the actuator into the selected actuator position, the high-capacity fluid valve into a selected valve position. For example, the fluid actuator 550 can be coupled to the actuator portion 522. When the fluid actuator 510 is actuated in response to locking of the lockout apparatus 150, the fluid actuator 550 can be fixed into a predetermined position.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A fluid control apparatus comprising:
a valve comprising:
a valve housing having an axial bore extending between a first end and a second end, a first inlet port in fluid communication with the axial bore, and a first outlet port in fluid communication with the axial bore; and
a piston located within the axial bore and having a first fluid passage and configured for reciprocal axial movement of the piston within the axial bore between a first position in which the first fluid passage aligns axially with the first inlet port and the first outlet port to form a first fluidic circuit in the first position, and a second position in which the piston blocks at least one of the first inlet port and the first outlet port; and
a lockout assembly comprising:
a stop comprising a cam configurable to a first rotary position in a first configuration and a second rotary position in a second configuration; and
a lever arm configured to reversibly secure the lockout assembly to a fastener in a first lever arm position to fix the piston into a selected position in the first configuration in which the stop contacts the piston, and not interfere with reciprocal axial movement of the piston in the second configuration in which the stop does not contact the piston.

2. The apparatus of claim 1, wherein the selected position is the first position.

3. The apparatus of claim 1, wherein the selected position is the second position.

4. The apparatus of claim 1, wherein the stop is disposed at an axial end of the piston.

5. The apparatus of claim 1, wherein:
the lockout assembly further comprises a support coupled to the valve housing and having a threaded bore therein;
the stop further comprises a fastener threadedly engaged with the threaded bore;
the first configuration comprises threading the fastener through the threaded bore so as to contact the piston; and
the second configuration comprises threading the fastener through the threaded bore so as to not contact the piston.

6. The apparatus of claim 1, wherein:
the valve housing further comprises a fluid chamber at one of the first end or the second end;
the piston further comprises an axial piston end forming a moveable portion of the fluid chamber, the piston being axially moveable to the selected position by fluidic pressure applied to the axial piston end.

7. The apparatus of claim 6, wherein:
the fluid chamber in fluidic communication with a second inlet port and a second outlet port;
the lockout assembly comprises an outlet valve in fluidic communication with the second outlet port; and
the first configuration permits the pressurized fluid to flow out of the fluid chamber, and the second configuration prevents flow of the pressurized fluid from the fluid chamber.

8. The apparatus of claim 7, wherein:
the second inlet port is in fluidic communication with a pressurized fluid;
the first configuration permits a threshold fluid pressure within the fluid chamber sufficient to urge the piston into the selected position; and
the second configuration relieves the fluid pressure within the fluid chamber below the threshold fluid pressure.

9. The apparatus of claim 6, wherein the lockout assembly comprises a stop configurable to extend through the fluid chamber and contact the axial piston end in the first configuration and not contact the axial piston end in the second configuration.

10. The apparatus of claim 1, wherein:
the piston is fluidly connected on a first end to a first fluid pressure chamber and fluidly connected on a second end to a second fluid pressure chamber, the piston configured for reciprocal axial movement in response to a pressure differential between a first fluid in the first fluid pressure chamber and a second fluid in the second fluid pressure chamber;
the valve further comprises a flapper assembly including an activation portion and closure portion, said closure portion of the flapper assembly extending from the activation portion, said flapper assembly configured to move said closure portion to engage a first fluid flow control element on the first fluid pressure chamber when the closure portion is in a first closure position and configured to move said closure portion to engage a second fluid flow control element on the second fluid pressure chamber when the closure portion is in a second closure position; and
the lockout assembly comprises a stop configurable to fix the activation portion in a selected activation position in the first configuration and not interfere with movement of the activation portion in the second configuration.

11. The apparatus of claim 10, wherein the selected activation position positions the closure to a selected closure position.

12. The apparatus of claim 11, wherein the selected closure position is the first closure position.

13. The apparatus of claim 11, wherein the selected closure position is the second closure position.

14. The apparatus of claim 10, wherein:
the lockout assembly further comprises a support coupled to the valve housing and having a threaded bore therein;
the stop further comprises a fastener threadedly engaged with the threaded bore;
the first configuration comprises threading the fastener through the threaded bore so as to contact the activation portion; and
the second configuration comprises threading the fastener through the threaded bore so as to not contact the activation portion.

15. The apparatus of claim 1, further comprising a fluid actuator comprising:
a stator portion;
an actuator portion; and
a fluid chamber between the stator portion and the actuator portion, the fluid chamber in fluid communication with the first outlet.

16. The apparatus of claim 15, further comprising a high-capacity fluid valve having a fluid control portion coupled to the actuator portion.

17. The apparatus of claim 16, wherein the fluid control portion is operable to control a flow of fluid to an aircraft component.

18. A method of controlling a fluid flow comprising:
providing a valve comprising:
a valve housing having an axial bore extending between a first end and a second end, a first inlet port in fluid communication with the axial bore, and a first outlet port in fluid communication with the axial bore; and
a piston located within the axial bore and having a first fluid passage and configured for reciprocal axial movement of the piston within the axial bore between a first position in which the first fluid passage aligns axially with the first inlet port and the first outlet port to form a first fluidic circuit in the first position, and a second position in which the piston blocks at least one of the first inlet port and the first outlet port;
providing a lockout assembly comprising:
a lever arm configured to reversibly secure the lockout assembly to a fastener in a first lever arm position to fix the piston into a selected position in a first configuration, and not interfere with reciprocal axial movement of the piston in a second configuration; and
a lock operable to prevent disengagement of the lockout assembly from the first configuration;
actuating the lockout assembly into the first configuration;
fixing, by the lockout assembly, the piston into a selected position; and
locking the lockout assembly into the first configuration.

19. The method of claim 18, wherein the selected position is the first position.

20. The method of claim 18, wherein the selected position is the second position.

21. The method of claim 18, further comprising:
actuating the lockout assembly into the second configuration; and
releasing, by the lockout assembly, the piston from being fixed in the selected position such that the lockout assembly does not interfere with reciprocal axial movement of the piston.

22. The method of claim 21, further comprising:
locking the lockout assembly into the second configuration, wherein the lockout assembly further comprises a lock operable to prevent disengagement of the lockout assembly from the second configuration.

23. The method of claim 18, further comprising contacting the piston with a stop, wherein the lockout assembly comprises the stop, the stop being configurable to contact the piston in the first configuration and not contact the piston in the second configuration.

24. The method of claim 23, wherein the stop comprises a cam, the first configuration comprises a first rotary position of the cam, and the second configuration comprises a second rotary position of the cam.

25. The method of claim 23, wherein:
the lockout assembly further comprises a support coupled to the valve housing and having a threaded bore therein;
the stop further comprises a fastener threadedly engaged with the threaded bore; and
contacting the piston with the stop further comprises threading the fastener through the threaded bore so as to contact the piston.

26. The method of claim 18, wherein:
the valve housing further comprises a fluid chamber at one of the first end or the second end;
the piston further comprises an axial piston end forming a moveable portion of the fluid chamber, the piston being axially moveable to the selected position by fluidic pressure applied to the axial piston end.

27. The method of claim 26, wherein:
the fluid chamber is in fluidic communication with a second inlet port and a second outlet port;
the lockout assembly comprises an outlet valve in fluidic communication with the second outlet port; and
actuating the lockout assembly into the second configuration further comprises preventing flow of the pressurized fluid from the fluid chamber.

28. The method of claim 27, wherein:
the second inlet port is in fluidic communication with a pressurized fluid;
actuating the lockout assembly into the first configuration further comprises permitting a threshold fluid pressure within the fluid chamber sufficient to urge the piston into the selected position; and
actuating the lockout assembly into the second configuration further comprises relieving the fluid pressure within the fluid chamber below the threshold fluid pressure.

29. The method of claim 26, wherein:
the piston is fluidly connected on a first end to a first fluid pressure chamber and fluidly connected on a second end to a second fluid pressure chamber, the piston configured for reciprocal axial movement in response to a pressure differential between a first fluid in the first fluid pressure chamber and a second fluid in the second fluid pressure chamber;
the valve further comprises a flapper assembly including an activation portion and closure portion, said closure portion of the flapper assembly extending from the activation portion, said flapper assembly configured to move said closure portion to engage a first fluid flow control element on the first fluid pressure chamber when the closure portion is in a first closure position and configured to move said closure portion to engage a second fluid flow control element on the second fluid pressure chamber when the closure portion is in a second closure position; and
the lockout assembly comprises a stop configurable to fix the activation portion in a selected activation position in the first configuration and not interfere with movement of the activation portion in the second configuration.

30. The method of claim 29, wherein the selected activation position positions the closure to a selected closure position.

31. The method of claim 30, wherein the selected closure position is the first closure position.

32. The method of claim 30, wherein the selected closure position is the second closure position.

33. The method of claim 29, wherein:
the lockout assembly further comprises a support coupled to the valve housing and having a threaded bore therein;
the stop further comprises a fastener threadedly engaged with the threaded bore;
actuating the lockout assembly into the first configuration further comprises threading the fastener through the threaded bore so as to contact the activation portion.

34. The method of claim 18, wherein the lockout assembly comprises a stop configurable to extend through the fluid chamber and contact the axial piston end in the first configuration and not contact the axial piston end in the second configuration.

35. The method of claim 18, further comprising:
providing a fluid actuator comprising:
    a stator portion;
    an actuator portion; and
    a fluid chamber between the stator portion and the actuator portion, the fluid chamber in fluid communication with the first outlet; and
fixing, in response to fixing the piston into the selected position, the fluid actuator into a selected fluid actuator position.

36. The method of claim 35, further comprising:
providing a high-capacity fluid valve having a fluid control portion coupled to the actuator portion; and
fixing, in response to fixing the actuator into the selected actuator position, the high-capacity fluid valve into a selected valve position.

37. The method of claim 36, wherein the fluid control portion is operable to control a flow of fluid to an aircraft component.

38. The method of claim 18, wherein the lockout assembly further comprises a valve, and the method further comprises:
providing a fluid pressure source;
configuring the valve into a first configuration;
providing a fluid path from the first outlet port to the fluid chamber;
configuring the valve into a second configuration;
providing a fluid path from the fluid pressure source to the fluid chamber.

* * * * *